(12) United States Patent
Petrov et al.

(10) Patent No.: US 9,184,970 B2
(45) Date of Patent: *Nov. 10, 2015

(54) PILOT PATTERNS FOR OFDM SYSTEMS WITH MULTIPLE ANTENNAS

(71) Applicant: Panasonic Corporation, Osaka (JP)

(72) Inventors: Mihail Petrov, Dresden (DE); Tomohiro Kimura, Osaka (JP); Mikihiro Ouchi, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/452,876

(22) Filed: Aug. 6, 2014

(65) Prior Publication Data

US 2014/0362947 A1    Dec. 11, 2014

Related U.S. Application Data

(62) Division of application No. 13/255,388, filed as application No. PCT/JP2011/000158 on Jan. 13, 2011, now Pat. No. 8,837,613.

(30) Foreign Application Priority Data

Jan. 13, 2010    (EP) ..................................... 10150668

(51) Int. Cl.
    *H04L 27/26* (2006.01)
    *H04L 25/02* (2006.01)

(52) U.S. Cl.
    CPC ........ *H04L 27/2613* (2013.01); *H04L 27/2611* (2013.01); *H04L 27/2627* (2013.01); *H04L 27/2649* (2013.01); *H04L 25/0224* (2013.01)

(58) Field of Classification Search
    CPC ............ H04L 25/0224; H04L 27/2611; H04L 27/2613; H04L 27/2627; H04L 27/2649
    See application file for complete search history.

(56) References Cited

U.S. PATENT DOCUMENTS

| 2003/0072254 A1 | 4/2003 | Ma et al. |
| 2006/0034164 A1 | 2/2006 | Ozluturk |

(Continued)

FOREIGN PATENT DOCUMENTS

| GB | 2 449 470 | 11/2008 |
| JP | 2009-134666 | 6/2009 |

(Continued)

OTHER PUBLICATIONS

"Digital Broadcasting Systems for Television, Sound and Data Services; framing structure, channel coding and modulation for digital terrestrial television", ETSI Standard ETS 300 744, V1.5.1, Jun. 2004.

(Continued)

*Primary Examiner* — Shuwang Liu
*Assistant Examiner* — Ross Varndell
(74) *Attorney, Agent, or Firm* — Wenderoth, Lind & Ponack, L.L.P.

(57) ABSTRACT

The present invention relates to orthogonal frequency-division multiplexing (OFDM) communication systems with four transmit antennas and one or more receive antennas, and in particular to methods for inserting scattered pilots (SPs) into the transmit signals of such OFDM systems, for estimating channel properties on the basis of the scattered pilots, a multi-antenna OFDM transmitter, and an OFDM receiver. In this context, it is the particular approach of the present invention to keep the same SP pattern like in the single-transmitter case, to partition the pilots into as many subsets as there are transmitters (transmit antennas), and to interleave these subsets both in time and in frequency. In this manner, the granularity of pilots of the same subset is reduced. This offers increased flexibility in designing the scattered pilot patterns and greater accuracy of the estimated channel properties.

2 Claims, 29 Drawing Sheets

(56) References Cited

U.S. PATENT DOCUMENTS

| | | |
|---|---|---|
| 2006/0064725 A1 | 3/2006 | Rabinowitz et al. |
| 2006/0153309 A1 | 7/2006 | Tang et al. |
| 2007/0115799 A1 | 5/2007 | Ting et al. |
| 2008/0123592 A1 | 5/2008 | Popovic |
| 2008/0253279 A1 | 10/2008 | Ma et al. |
| 2009/0103651 A1 | 4/2009 | Lahtonen et al. |
| 2009/0213948 A1 | 8/2009 | Ma et al. |
| 2009/0279623 A1 | 11/2009 | Wu et al. |
| 2010/0202574 A1 | 8/2010 | Chen et al. |
| 2010/0272199 A1 | 10/2010 | Hayashi et al. |
| 2010/0310013 A1 | 12/2010 | Houchi et al. |

FOREIGN PATENT DOCUMENTS

| | | |
|---|---|---|
| TW | 267262 | 11/2006 |
| TW | 274482 | 2/2007 |
| TW | 314411 | 9/2009 |
| WO | 2005/088882 | 9/2005 |
| WO | 2006/133600 | 12/2006 |
| WO | 2007/022628 | 3/2007 |
| WO | 2009/001528 | 12/2008 |

OTHER PUBLICATIONS

International Search Report issued Mar. 14, 2011 in International (PCT) Application No. PCT/JP2011/000158.

European Search Report dated Jun. 30, 2010 issued in European Patent Application No. 10150668.1.

Nortel: "Proposal for the Downlink Pilots for E-UTRA", 3 GPP DRAFT, R1-051155, $3^{rd}$ Generation Partnership Project, Mobile Competence Centre, 650, Route Des Lucioles, F-06921 Sophia-Antipolis Cedex, vol. RAN WG1, No. San Diego, USA, Oct. 4, 2005, XP050100764, pp. 7-10 and 15.

Nortel: "Proposal for the Downlink Synchronization Channel for E-UTRA", 3 GPP DRAFT, R1-051156, $3^{rd}$ Generation Partnership Project, Mobile Competence Centre, 650, Route Des Lucioles, F-06921 Sophia-Antipolis Cedex, vol. RAN WG1, No. San Diego, USA, Oct. 4, 2005, XP050100765, pp. 8-9.

Qualcomm Europe: "Initial Comparison of MIMO Schemes for OFDM based E-UTRA Downlink", 3 GPP DRAFT, R1-051505, $3^{rd}$ Generation Partnership Project, Mobile Competence Centre, 650, Route Des Lucioles, F-06921 Sophia-Antipolis Cedex, vol. RAN WG1, No. Seoul, Korea, Nov. 1, 2005, XP050101082.

Office Action issued Jan. 26, 2015 in Taiwanese Application No. 100101379, with partial English translation.

○ cell for which channel estimate is available

Fig. 12A

| Subset 1: | Subset 2: | Subset 3: | Subset 4: |
|---|---|---|---|
| $c_{11}$ | $c_{21}$ | $c_{31}$ | $c_{41}$ |
| $c_{12}$ | $c_{22}$ | $c_{32}$ | $c_{42}$ |
| $c_{13}$ | $c_{23}$ | $c_{33}$ | $c_{43}$ |
| $c_{14}$ | $c_{24}$ | $c_{34}$ | $c_{44}$ |

Antenna 1: / Antenna 2: / Antenna 3: / Antenna 4:

Fig. 12B

| Subset 1: | Subset 2: | Subset 3: | Subset 4: |
|---|---|---|---|
| +1 | +1 | +1 | +1 |
| +1 | −1 | +1 | −1 |
| +1 | +1 | −1 | −1 |
| +1 | −1 | −1 | +1 |

Antenna 1: / Antenna 2: / Antenna 3: / Antenna 4:

PILOT PATTERNS FOR OFDM SYSTEMS WITH MULTIPLE ANTENNAS

BACKGROUND OF THE INVENTION

1. Field of the Invention

The present invention relates to OFDM (orthogonal frequency-division multiplexing) communication systems with a plurality of (e.g., four) transmit antennas and one or more receive antennas, and in particular to methods for inserting scattered pilots into the transmit signals of such OFDM systems, for estimating channel properties on the basis of the scattered pilots, a multi-antenna OFDM transmitter, and an OFDM receiver.

2. Description of the Related Art

Orthogonal Frequency-Division Multiplexing (OFDM) is a digital multi-carrier modulation scheme, which uses a large number of closely-spaced orthogonal sub-carriers. Each sub-carrier is modulated with a conventional modulation scheme (such as quadrature amplitude modulation) at a low symbol rate, maintaining data rates similar to conventional single-carrier modulation schemes in the same bandwidth.

The primary advantage of OFDM over single-carrier schemes is its ability to cope with severe channel conditions, for example, attenuation of high frequencies at a long copper wire, narrowband interference and frequency-selective fading due to multipath, without complex equalization filters. Channel equalization is simplified because OFDM may be viewed as using many slowly-modulated narrowband signals rather than one rapidly-modulated wideband signal. Low symbol rate makes the use of a guard interval between symbols affordable, making it possible to handle time-spreading and eliminate inter-symbol interference.

In OFDM communications, scattered pilots (SP) are typically used for channel estimation and equalization. Scattered pilots are complex OFDM cells with known phase and amplitude arranged in frequency and time according to a defined pattern. The pilots are typically selected from a binary alphabet, e.g., $\{+1; -1\}$ and are boosted in power compared to the data cells.

FIG. 1 shows an example of such a pattern in the form of a diagonal grid, as it is used in DVB-T (digital video broadcasting terrestrial), i.e., a digital broadcasting standard based on OFDM (cf. the ETSI Standard ETS 300 744, "Digital Broadcasting Systems for Television, Sound and Data Services; framing structure, channel coding and modulation for digital terrestrial television"). The pilots are indicated by the black circles, whereas the data cells are indicated by open circles.

The scattered pattern shown in FIG. 1 is characterized by two parameters: $D_s$ is the distance between SPs that are adjacent along the time axis in a pilot-bearing subcarrier, and $D_k$ is the distance between two SP-bearing subcarriers that are adjacent along the frequency axis. These two parameters are also referred to as the SP spacing in time and frequency, respectively. In this type of pattern, SPs are present in every OFDM symbol and the distance between two SPs in a symbol is $D_s D_k$. The present invention builds on such a SP pattern. In DVB-T, $D_s=4$ and $D_k=3$, as shown in FIG. 1.

Since the channel (the state of the channel) usually varies (fades) in time, due to Doppler variations, and in frequency, due to multi-path delay, the SP pattern must be dense enough to sample the channel variations along both axes as required by the sampling theorem. The $D_s$ parameter defines the sampling along the time axis, whereas the $D_k$ parameter defines the sampling along the frequency axis.

The channel estimation process consists of two steps. First, the channel is estimated at the SP positions by dividing the received value by the known pilot value (the reference signal). Second, the channel estimates for the other cells are computed by interpolating between the estimates at the SP positions. The interpolation is conceptually two-dimensional, but can be practically performed by first interpolating in time then in frequency, as shown in FIG. 9. Moreover, interpolation can be combined with noise reduction in order to improve the accuracy of the estimate.

In order to increase the communication reliability, multiple transmitters operating in parallel in the same frequency band can be used. This is referred to in the art as multiple-input single-output (MISO), when there is one receiver, or multiple-input multiple-output (MIMO), when there are multiple receivers. As in the single-transmitter case, channel estimation is required for coherent demodulation.

In the general MIMO case, the channel between each transmitter and each receiver must be estimated. A MIMO configuration for 4 transmitters and 2 receivers is shown in FIG. 10 as an example. We can express the received signal vector y as a function of the transmitted signal vector x and the channel matrix H as shown in the following Math. 1.

$$\begin{bmatrix} y_1 \\ \vdots \\ y_M \end{bmatrix} = \begin{bmatrix} h_{11} & \cdots & h_{1N} \\ \vdots & \ddots & \vdots \\ h_{M1} & \cdots & h_{MN} \end{bmatrix} \begin{bmatrix} x_1 \\ \vdots \\ x_N \end{bmatrix} \quad [\text{Math. 1}]$$

wherein N is the number of transmitters, e.g., N=4, and M is the number of receivers. All quantities are complex valued.

A channel estimation process is performed by each receiver independently. For channel estimation purposes the number of receivers is therefore irrelevant. The signal seen by a receiver can be written as shown in the following Math. 2.

$$y = \sum_{n=1}^{N} h_n x_n \quad [\text{Math. 2}]$$

Each receiver produces estimates of the N channel components $h_1, \ldots, h_N$ at each OFDM cell based on the values received at the SP locations.

Any implementation of an MISO or MIMO system based on OFDM thus has to define (i) how the scattered pilots are to be encoded so that the N channel components can be easily estimated in the receiver and (ii) how the scattered pilots are to be arranged in time and frequency.

The key idea for estimating the channel components is to employ different SPs for different transmitters. In order to be able to estimate the individual channel components, the SPs are partitioned into as many subsets as there are transmitters. All pilots belonging to a subset are multiplied by a constant coefficient that depends on the subset and the transmitter (transmit antenna). In the four-transmitter (four-transmit antenna) case, there are 16 coefficients, which can be expressed as a 4×4 matrix, as shown in FIGS. 12A and 12B. The rows correspond to the transmitters (transmit antennas) and the columns to the SP subsets.

According to FIG. 12A, a pilot that is transmitted by a transmit antenna n and belongs to subset m is multiplied by a coefficient $C_{mn}$. For example, a result of multiplying a pilot by one of the four coefficients $C_{11}$ (for the transmit antenna 1), $C_{12}$ (for the transmit antenna 2), $C_{13}$ (for the transmit antenna 3), and $C_{14}$ (for the transmit antenna 4) is used as an SP to be allocated to signals transmitted in subset 1.

Regarding the values of the coefficients, there is one necessary and sufficient condition that must be met in order to be able to separate the channel components in the receiver: the coefficient matrix must be full rank, i.e. invertible. The justification is readily apparent if we write the received values at the pilot locations as in the following Math. 3.

$$y_m = \left( \sum_{n=1}^{N} h_n c_{mn} \right) p_m \quad \text{[Math. 3]}$$

In the above Math. 3, $p_m$ is the original value (before multiplication) of a pilot in subset m, $y_m$ is the received value at the location of the said pilot, $h_n$ is the channel between transmitter (transmit antenna) n and receiver, and $c_{mn}$ is the constant pilot coefficient for subset m and transmitter (transmit antenna) n. For simplicity the channel noise has not been considered here.

The original pilot values $p_m$ are irrelevant. Denoting the $y_m/p_m$ ratio by $e_m$, the equation of the above Math. 3 can be expressed in matrix form shown in the following Math. 4.

$$\begin{bmatrix} e_1 \\ \vdots \\ e_M \end{bmatrix} = \begin{bmatrix} c_{11} & \cdots & c_{1N} \\ \vdots & \ddots & \vdots \\ c_{M1} & \cdots & c_{MN} \end{bmatrix} \begin{bmatrix} h_1 \\ \vdots \\ h_N \end{bmatrix} \quad \text{[Math. 4]}$$

The channel estimates for the channels $h_1$ to $h_N$ can be computed by left multiplying the $e_m$ estimates by the inverse of the coefficients matrix as shown in the following Math. 5.

$$\begin{bmatrix} h_1 \\ \vdots \\ h_N \end{bmatrix} = \begin{bmatrix} c_{11} & \cdots & c_{1N} \\ \vdots & \ddots & \vdots \\ c_{M1} & \cdots & c_{MN} \end{bmatrix}^{-1} \begin{bmatrix} e_1 \\ \vdots \\ e_M \end{bmatrix} \quad \text{[Math. 5]}$$

As apparent from the above Math. 5, an inverse of the coefficients matrix is inevitable for channel estimation. This is the reason why the coefficients matrix must be full rank.

Although any full-rank complex matrix will do, the following two matrices are typically used in the art because of their simplicity:

Unitary diagonal matrix (exists for any N)

$$\begin{bmatrix} 1 & 0 & 0 & 0 \\ 0 & 1 & 0 & 0 \\ 0 & 0 & 1 & 0 \\ 0 & 0 & 0 & 1 \end{bmatrix} \quad \text{[Math. 6]}$$

Hadamard matrix (exists only for N=2 or a multiple of 4)

$$\begin{bmatrix} +1 & +1 & +1 & +1 \\ +1 & -1 & +1 & -1 \\ +1 & +1 & -1 & -1 \\ +1 & -1 & -1 & +1 \end{bmatrix} \quad \text{[Math. 7]}$$

Physically, using a unitary diagonal matrix means that for antenna n only the pilots in subset n are non-zero. This means that the received values at those positions corresponding to pilots of subset n can be used for computing the estimate of channel component $h_n$ for that position, with no further signal processing.

Using a Hadamard matrix for pilot encoding requires a multiplication with this matrix to be performed in the receiver for each cell. Such a multiplication is also referred to as a Hadamard transform. The schematic of an optimized implementation, known in the art as the fast Hadamard transform, is shown in FIG. 13.

The remaining question is how to arrange the scattered pilots in time and frequency. One option is to keep the same SP pattern like in the single-transmitter case, in which case the placement is known and only the partitioning into subsets has to be clarified.

Patent Citation 1 provides one possible solution to the question of how to arrange the scattered pilots in time and frequency. According to Patent Citation 1, the scattered pilots are arranged in accordance with the same pattern as in the single-transmitter case in time and frequency, and different subsets of pilots are allocated to different pilot-bearing subcarriers. In other words, the scattered pilots are partitioned into subsets according to their subcarrier index. Thus, the N subsets of scattered pilots are evenly interleaved in frequency, i.e. along the subcarrier axis. FIGS. 2 and 3 illustrate examples of subset arrangement patterns as taught by Patent Citation 1 for two and four transmitters, respectively.

An alternative approach is known from Patent Citation 2, according to which the N subsets of scattered pilots are evenly (equally-spaced) interleaved in time, i.e. along the symbol axis. FIGS. 4 and 5 illustrate examples of subset arrangement patterns as taught by Patent Citation 2 for two and four transmitters, respectively.

Instead of keeping the pilot pattern of the single-transmitter case, pilots of the N subsets may be grouped, as indicated in FIG. 6. This approach is called "grouped interleaving" and is to be contrasted to the approach of "equally-spaced interleaving" or "even interleaving" illustrated in FIGS. 2 to 5. In the case of four transmitters (transmit antennas), there may be groups of four pilots (from subsets 1/2/3/4) or groups of two pilots (from subsets 1/2 and 3/4 for example). FIG. 6 shows the former case. Referring to FIG. 6, the groups themselves are arranged so as to be scattered in time and frequency, just like the individual scattered pilots in the single-transmitter case.

In general, interleaving N pilot subsets in one direction (time or frequency) increases the effective pilot distance in said direction by a factor of N. In order to compensate for this effect and preserve the effective distance, the physical pilot distance must be decreased by the same factor. Thus, if 4 subsets are interleaved in frequency, as in Patent Citation 1, $D_k$ must be reduced by a factor of 4. Likewise, if the 4 subsets are multiplexed in time, as in Patent Citation 2, $D_s$ must be reduced by the same factor.

Since the physical $D_k$ and $D_s$ must be integers, the effective distances $D_{k,eff}$ and $D_{s,eff}$ will always be multiples of 4 when interleaving the subsets in one direction only. Such a granularity of the subsets may be too coarse for some applications.

CITATION LIST

Patent Literature

PTL 1:
  GB 2449470A
PTL 2:
  WO 2009/001528 A1

BRIEF SUMMARY OF THE INVENTION

It is therefore an object of the present invention to provide an SP pattern with a finer granularity without increasing the total number of pilots in OFDM systems with a plurality of (e.g., four) transmit antennas. It is also an object of the present invention to provide a method used by a receiver compatible with multi-antenna transmitters to perform channel estimation in OFDM systems with a plurality of (e.g., four) transmit antennas.

The above objects are achieved by the features as set forth in the independent claims.

Preferred embodiments are the subject matter of dependent claims.

It is the particular approach of the present invention to keep the same SP pattern like in the single-transmitter case, to partition the pilots into as many subsets as there are transmit antennas, and to interleave these subsets both in time and in frequency.

According to a first aspect of the present invention, a multi-antenna OFDM transmitter is provided. The multi-antenna OFDM transmitter has N antennas, N being an integer greater than or equal to two. The multi-antenna OFDM transmitter comprises: a multi-antenna encoder for generating a plurality of data streams, one for each of the N transmit antennas, each data stream consisting of a succession of OFDM symbols, each OFDM symbol consisting of a plurality of OFDM cells, each OFDM cell being associated with one of a plurality of subcarriers; a pilot generation unit for generating, for each of the plurality of data streams, a plurality of scattered pilots, said plurality of scattered pilots being partitioned into M subsets, each of the scattered pilots being encoded on the basis of the subset to which the scattered pilot belongs and the data stream into which the scattered pilot is to be inserted, and a plurality of pilot inserting units, each pilot inserting unit for inserting one of the plurality of scattered pilots into a corresponding one of the plurality of data streams in accordance with a predefined periodic pattern in which a temporal spacing between two OFDM symbols having scattered pilots in OFDM cells associated with the same subcarrier is equal to $D_s$ and a frequency spacing of two subcarriers bearing scattered pilots in any of the OFDM symbols is equal to $D_k$, each of $D_s$ and $D_k$ being an integer greater than or equal to two, wherein M is greater than or equal to N and satisfies a relationship $M=M_s M_k$, each of $M_s$ and $M_k$ being an integer greater than or equal to two, and each of the plurality of pilot inserting units inserts the scattered pilots in such a manner that a temporal spacing between two OFDM symbols having scattered pilots of the same subset in OFDM cells associated with the same subcarrier is equal to $D_s M_s$ and a frequency spacing of two subcarriers bearing scattered pilots of the same subset in any of the OFDM symbols is equal to $D_k M_k$.

In the above multi-antenna OFDM transmitter, each of M and N may be equal to four, and each of $M_s$ and $M_k$ may be equal to two.

In the above multi-antenna OFDM transmitter, $D_k$ may be equal to two, three, or four.

In the above multi-antenna OFDM transmitter, the pilot generation unit may encode the scattered pilots by, for each subset, multiplying all scattered pilots of the subset with a constant coefficient that depends on the subset and the data stream into which said all scattered pilots of the subset are to be inserted.

In the above multi-antenna OFDM transmitter, a matrix formed by the constant coefficients used for multiplying the scattered pilots may be invertible, in particular a unitary diagonal matrix or a Hadamard matrix.

According to a further aspect of the present invention, an OFDM receiver is provided. The OFDM receiver comprises: an OFDM demodulator for obtaining a data stream consisting of a succession of OFDM symbols, each OFDM symbol consisting of a plurality of OFDM cells, each OFDM cell being associated with one of a plurality of subcarriers; a pilot extraction unit for (i) extracting scattered pilots from the data stream in accordance with a predefined periodic pattern in which a temporal spacing between two OFDM symbols having scattered pilots in OFDM cells associated with the same subcarrier is equal to $D_s$ and a frequency spacing of two subcarriers bearing scattered pilots in any of the OFDM symbols is equal to $D_k$, each of $D_s$ and $D_k$ being an integer greater than or equal to two, and (ii) partitioning the extracted scattered pilots into M subsets; and a channel estimation unit for estimating a plurality of channel components from the M subsets of scattered pilots, each channel component representing a channel condition between one of a plurality of transmitters and the OFDM receiver, wherein M satisfies a relationship $M=M_s M_k$, each of $M_s$ and $M_k$ being an integer greater than or equal to two, and a temporal spacing between two OFDM symbols having scattered pilots of the same subset in OFDM cells associated with the same subcarrier is equal to $M_s D_s$ and a frequency spacing of two subcarriers bearing scattered pilots of the same subset in any of the OFDM symbols is equal to $M_k D_k$.

In the above OFDM receiver, M may be equal to four, and each of $M_s$ and $M_k$ may be equal to two.

In the above OFDM receiver, $D_k$ may be equal to two, three, or four.

In the above OFDM receiver, the pilot extraction unit may extract, for each OFDM symbol, at least one continual pilot from OFDM symbols associated with predefined subcarriers and partition the extracted continual pilots into the M subsets, and the channel estimation unit may estimate the plurality of channel components from the M subsets of scattered pilots and continual pilots.

In the above OFDM receiver, the predefined subcarriers may be the subcarriers bearing scattered pilots.

In the above OFDM receiver, the predefined subcarriers may be distinct from the subcarriers bearing scattered pilots.

In the above OFDM receiver, continual pilots extracted from the same subcarrier may be partitioned into the same subset.

In the above OFDM receiver, continual pilots extracted from the same subcarrier may be partitioned into at least two different subsets.

According to a further aspect of the present invention, a method for inserting scattered pilots into transmit signals is provided. The method is used by a multi-antenna transmitter with N transmit antennas for inserting scattered pilots into transmit signals. The method comprises the steps of: generating a plurality of data streams, one for each of the N transmit antennas, each data stream consisting of a succession of OFDM symbols, each OFDM symbol consisting of a plurality of OFDM cells, each OFDM cell being associated with one of a plurality of subcarriers; generating, for each of the plurality of data streams, a plurality of scattered pilots, said plurality of scattered pilots being partitioned into M subsets, each of the scattered pilots being encoded on the basis of the subset to which the scattered pilot belongs and the data stream into which the scattered pilot is to be inserted, and inserting one of the plurality of scattered pilots into a corresponding one of the plurality of data streams in accordance with a predefined periodic pattern in which a temporal spacing between two OFDM symbols having scattered pilots in OFDM cells associated with the same subcarrier is equal to $D_s$ and a frequency spacing of two subcarriers bearing scattered pilots in any of the OFDM symbols is equal to $D_k$, each of $D_s$ and $D_k$ being an integer greater than or equal to two, wherein M is greater than or equal to N and satisfies a relationship $M=M_s M_k$, each of $M_s$ and $M_k$ being an integer greater than or equal to two, and in the inserting step, the scattered pilots are inserted in such a manner that a temporal spacing between two OFDM symbols having scattered pilots of the same subset in OFDM cells associated with the same subcarrier is equal to $D_s M_s$ and a frequency spacing of two subcarriers bearing scattered pilots of the same subset in any of the OFDM symbols is equal to $D_k M_k$.

In the above method, each of M and N may be equal to four, and each of $M_s$ and $M_k$ may be equal to two.

According to a further aspect of the present invention, a method for estimating, at an OFDM receiver, channel properties between the OFDM receiver and each of N transmit antennas is provided. The method comprises the steps of: obtaining a data stream consisting of a succession of OFDM symbols, each OFDM symbol consisting of a plurality of OFDM cells, each OFDM cell being associated with one of a plurality of subcarriers; extracting scattered pilots from the data stream in accordance with a predefined periodic pattern in which a temporal spacing between two OFDM symbols having scattered pilots in OFDM cells associated with the same subcarrier is equal to $D_s$ and a frequency spacing of two subcarriers bearing scattered pilots in any of the OFDM symbols is equal to $D_k$, each of $D_s$ and $D_k$ being an integer greater than or equal to two, and partitioning the extracted scattered pilots into M subsets; and estimating a plurality of channel components from the M subsets of scattered pilots, each channel component representing a channel condition between one of a plurality of transmitters and the OFDM receiver, wherein M satisfies a relationship $M=M_s M_k$, each of $M_s$ and $M_k$ being an integer greater than or equal to two, and a temporal spacing between two OFDM symbols having scattered pilots of the same subset in OFDM cells associated with the same subcarrier is equal to $M_s D_s$ and a frequency spacing of two subcarriers bearing scattered pilots of the same subset in any of the OFDM symbols is equal to $M_k D_k$.

In the above method, each of M and N may be equal to four, and each of $M_s$ and $M_k$ may be equal to two.

The above and other objects and features of the present invention will become more apparent from the following description and preferred embodiments given in conjunction with the accompanying drawings.

BRIEF DESCRIPTION OF THE DRAWINGS

FIG. 12A shows the 16 pilot-multiplication coefficients for the 4-transmitter case.

FIG. 12B shows the preferred realization of FIG. 12A as a Hadamard matrix.

DETAILED DESCRIPTION OF THE INVENTION

The present invention provides methods for inserting scattered pilots (SPs) into the transmit signals of multi-antenna OFDM systems, for estimating channel properties on the basis of the scattered pilots, a multi-antenna OFDM transmitter, and a corresponding OFDM receiver. The inventive methods and apparatuses achieve a high granularity of the scattered pilots in both the time and the frequency directions, which is a prerequisite for efficiently estimating channel properties in apparatuses that receive signals into which scattered pilots have been inserted.

To this end, it is the particular approach of the present invention to keep the same scattered pilot pattern like in the single-transmitter case, to partition the pilots into as many subsets as there are transmit antennas, and to interleave these subsets both in time and in frequency. In this manner, the granularity of the subsets is reduced compared to conventional technologies since, in the four transmitter case, $D_{k,\mathit{eff}}$ and $D_{s,\mathit{eff}}$ are multiples of 2 instead of 4. This offers increased flexibility in designing the scattered pilot patterns.

Figure 7:
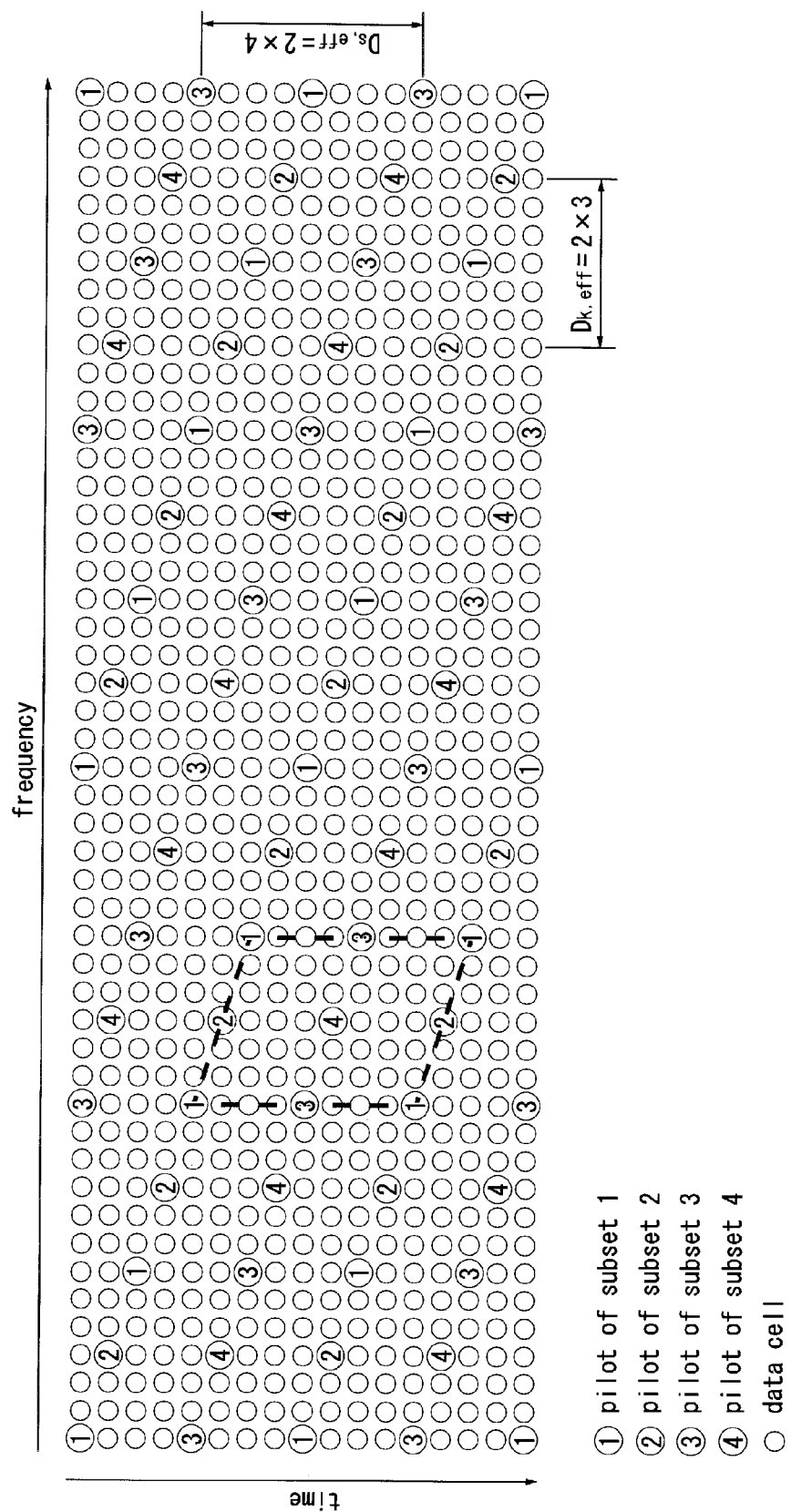
FIG. 7 shows an SP pattern for four transmitters (transmit antennas) and equally-spaced interleaving in time and frequency in accordance with an embodiment of the present invention.

FIG. 7 shows a scattered pilot pattern for four transmitters and equally-spaced interleaving in time and frequency in accordance with an embodiment of the present invention. Each circle represents one OFDM cell, each row of circles corresponds to one OFDM symbol, and each column represents one subcarrier. Pilots are indicated by large circles, whereas data cells are indicated by small circles.

The scattered pilots are divided into four subsets denoted by numerals 1, 2, 3, and 4, respectively. The number of subsets corresponds to the number of distinct transmitter antennas, i.e., four in this case.

Figure 1:
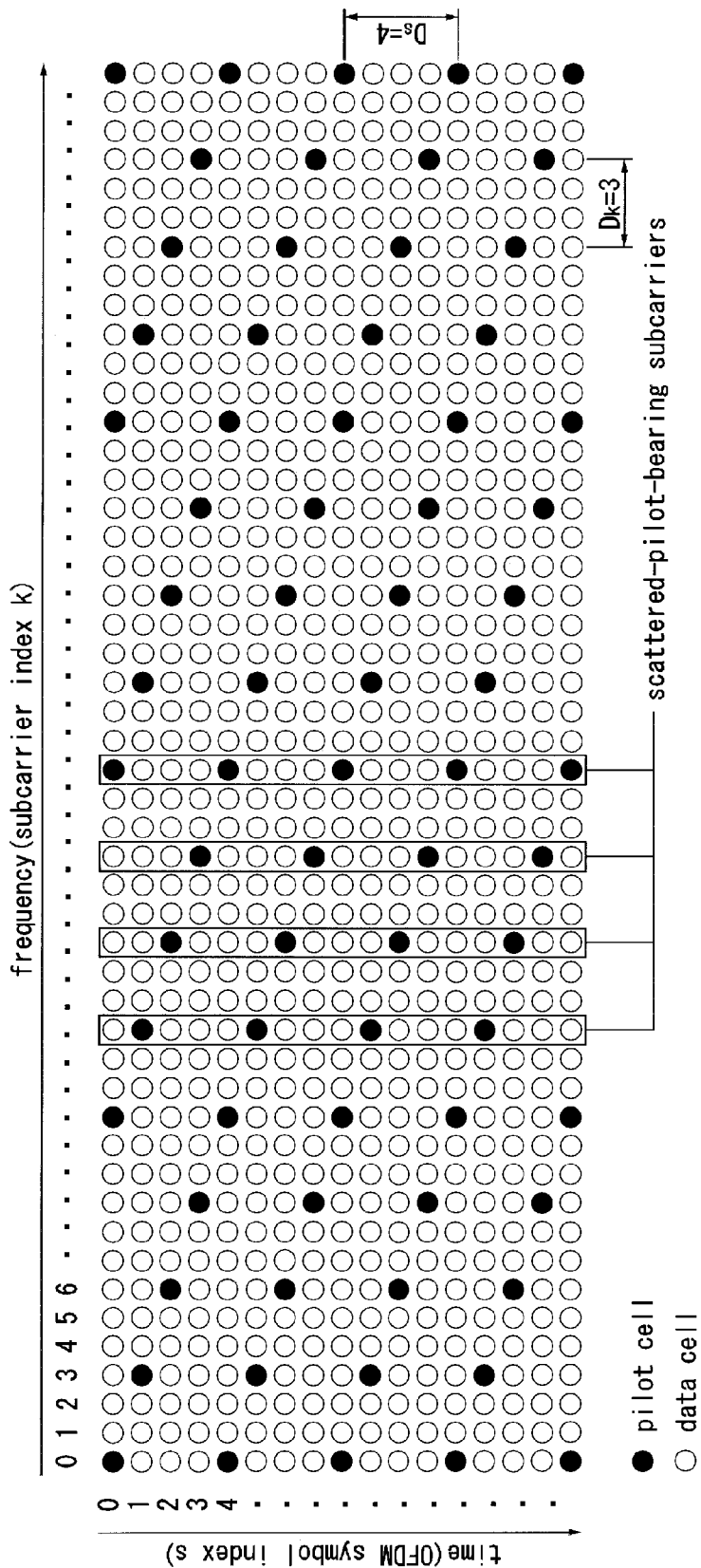
FIG. 1 shows a conventional single-transmitter SP pattern as it is used in the European digital broadcasting standard DVB-T.

As it is apparent from a comparison of FIG. 1 and FIG. 7, the scattered pilots are arranged in accordance with the same pattern as in the conventional single-transmitter case (DVB-T), i.e., in the form of a diagonal grid. The pilot cells, whatever subset they belong to, are interleaved with the data cells such that the distance between two adjacent pilot cells in a pilot-bearing subcarrier in the time direction is $D_s=4$ and the distance between two adjacent SP-bearing subcarriers in the frequency direction is $D_k=3$.

Figure 2:
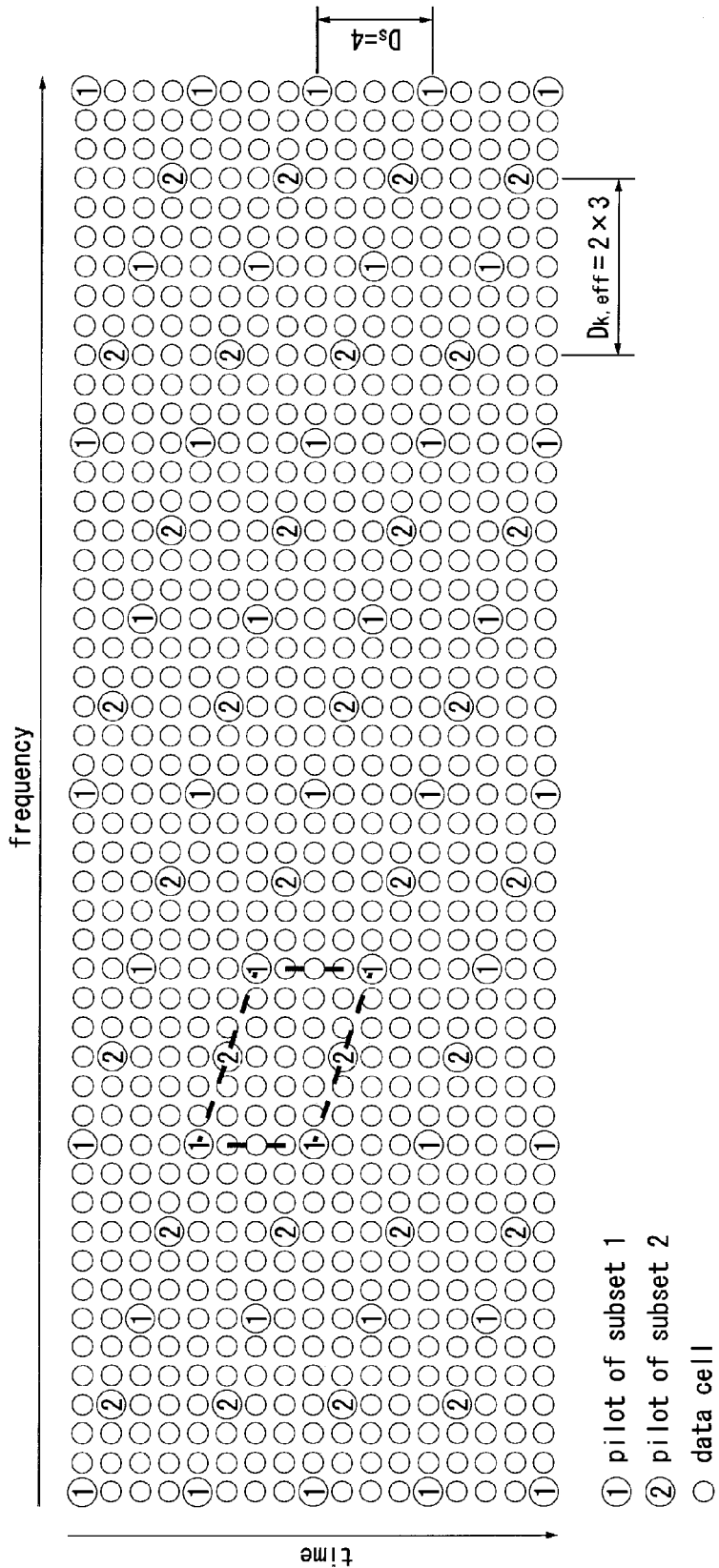
FIG. 2 shows a conventional two-transmitter (two-transmit antenna) SP pattern with equally-spaced interleaving in frequency.

The pilot cells of any given subset, on the other hand, are interleaved with the pilot cells of the other subsets both in time and frequency. In other words, the subset to which a pilot belongs alternates both in the frequency and the time directions. This is to be contrasted with the conventional multi-antenna SP patterns of FIGS. 2 and 3, wherein a certain subcarrier or a certain OFDM symbol carries only pilots of one and the same subset.

With the inventive SP pattern of FIG. 7, the effective distance in the time direction $D_{s,\mathit{eff}}$ between two pilots of the same subset equals $2D_s$, i.e., twice the SP spacing in the time direction $D_s$, and the effective distance in the frequency direction $D_{k,\mathit{eff}}$ between two pilots of the same subset equals $2D_k$, i.e., twice the SP spacing in the frequency direction $D_k$.

Figure 3:
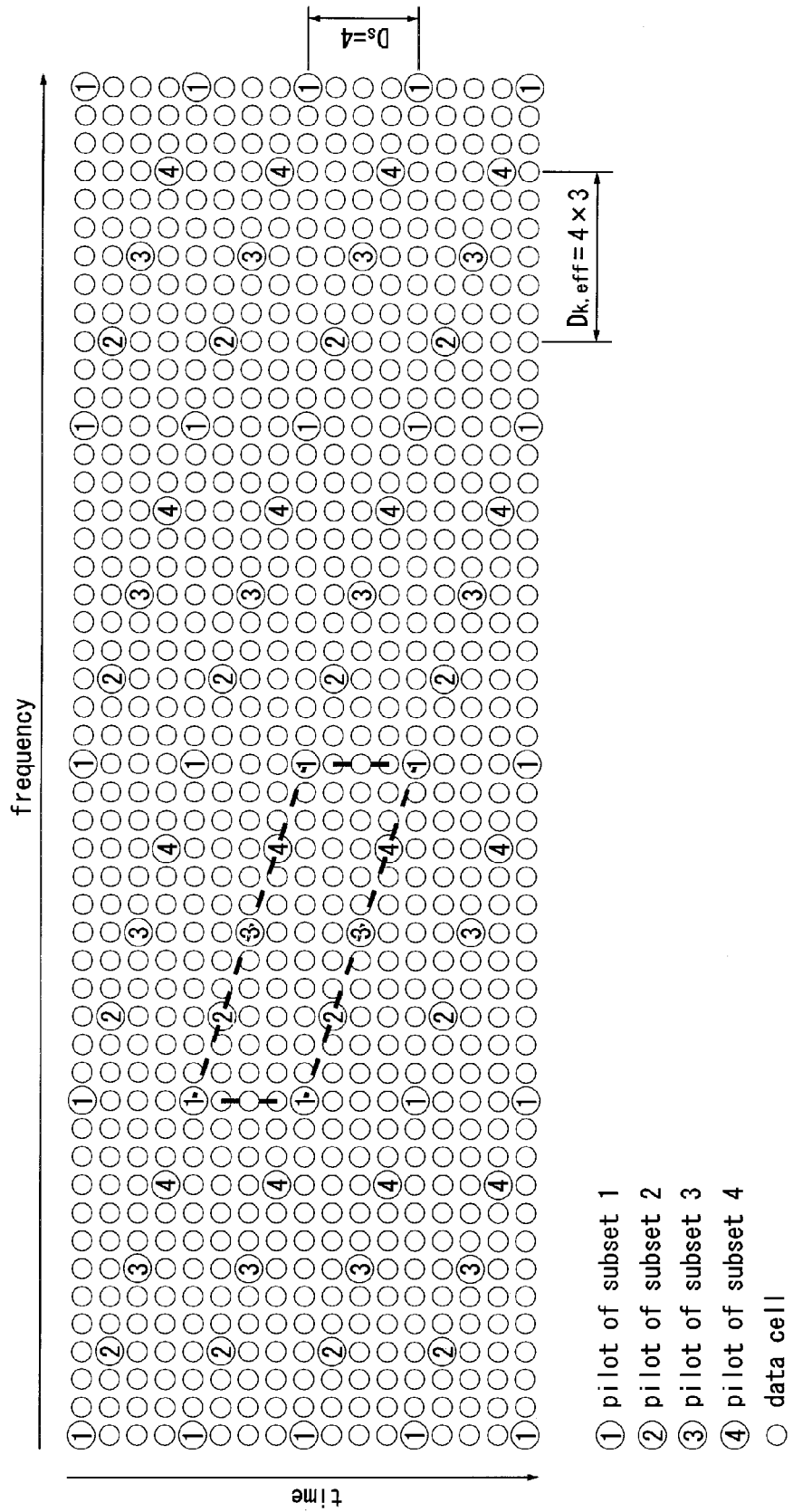
FIG. 3 shows a conventional four-transmitter (four-transmit antenna) SP pattern with equally-spaced interleaving in frequency.
Figure 4:
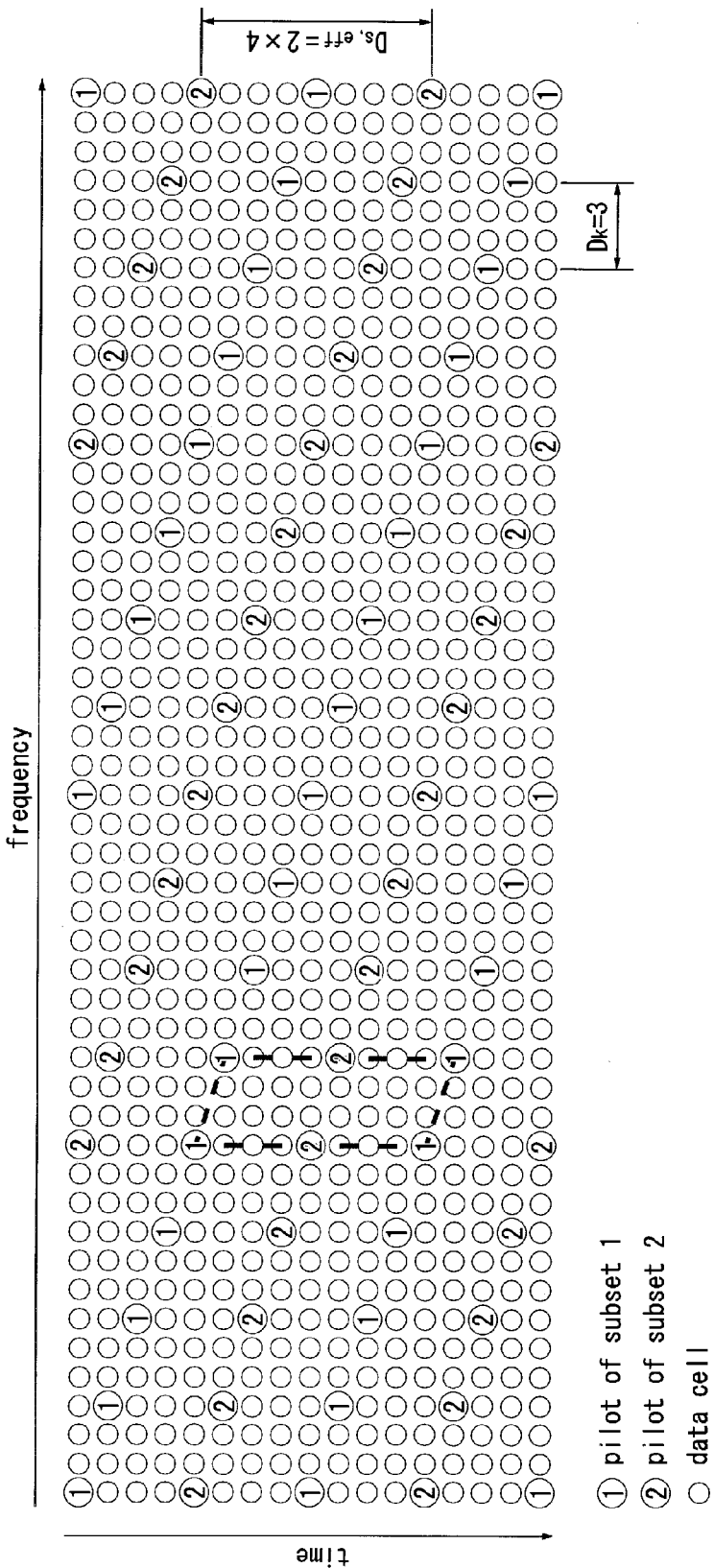
FIG. 4 shows a conventional two-transmitter (two-transmit antenna) SP pattern with equally-spaced interleaving in time.

This is to be contrasted with the conventional multi-antenna SP patterns of FIG. 3, wherein the effective distance in the frequency direction $D_{k,\mathit{eff}}$ between two pilots of the same subset equals $4D_k$, i.e., four times the SP spacing in the frequency direction $D_k$. This is also to be contrasted with the conventional multi-antenna SP patterns of FIG. 5, wherein the effective distance in the time direction $D_{s,\mathit{eff}}$ between two pilots of the same subset equals $4D_s$, i.e., four times the SP spacing in the time direction $D_s$.

Figure 5:
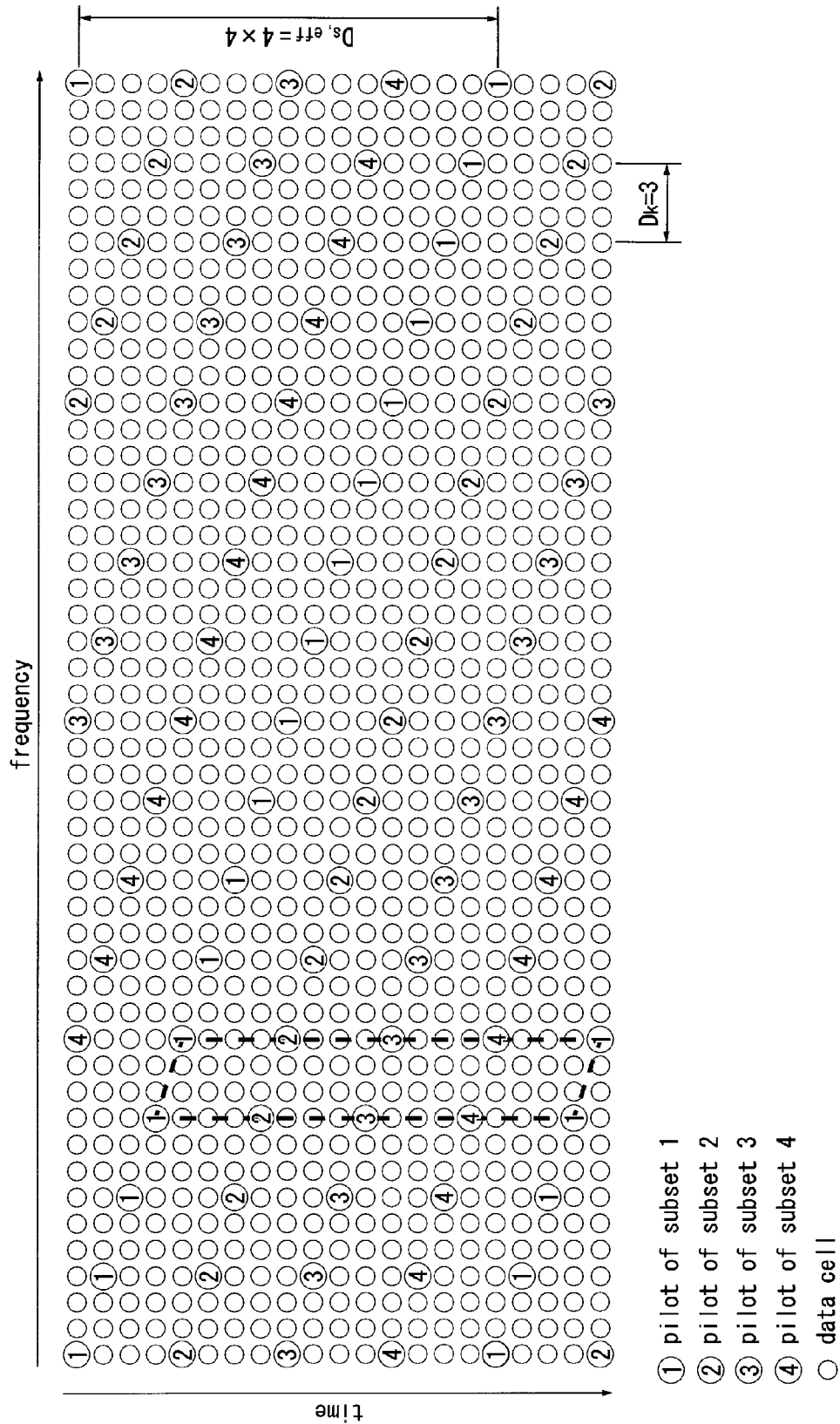
FIG. 5 shows a conventional four-transmitter (four-transmit antenna) SP pattern with equally-spaced interleaving in time.
Figure 6:
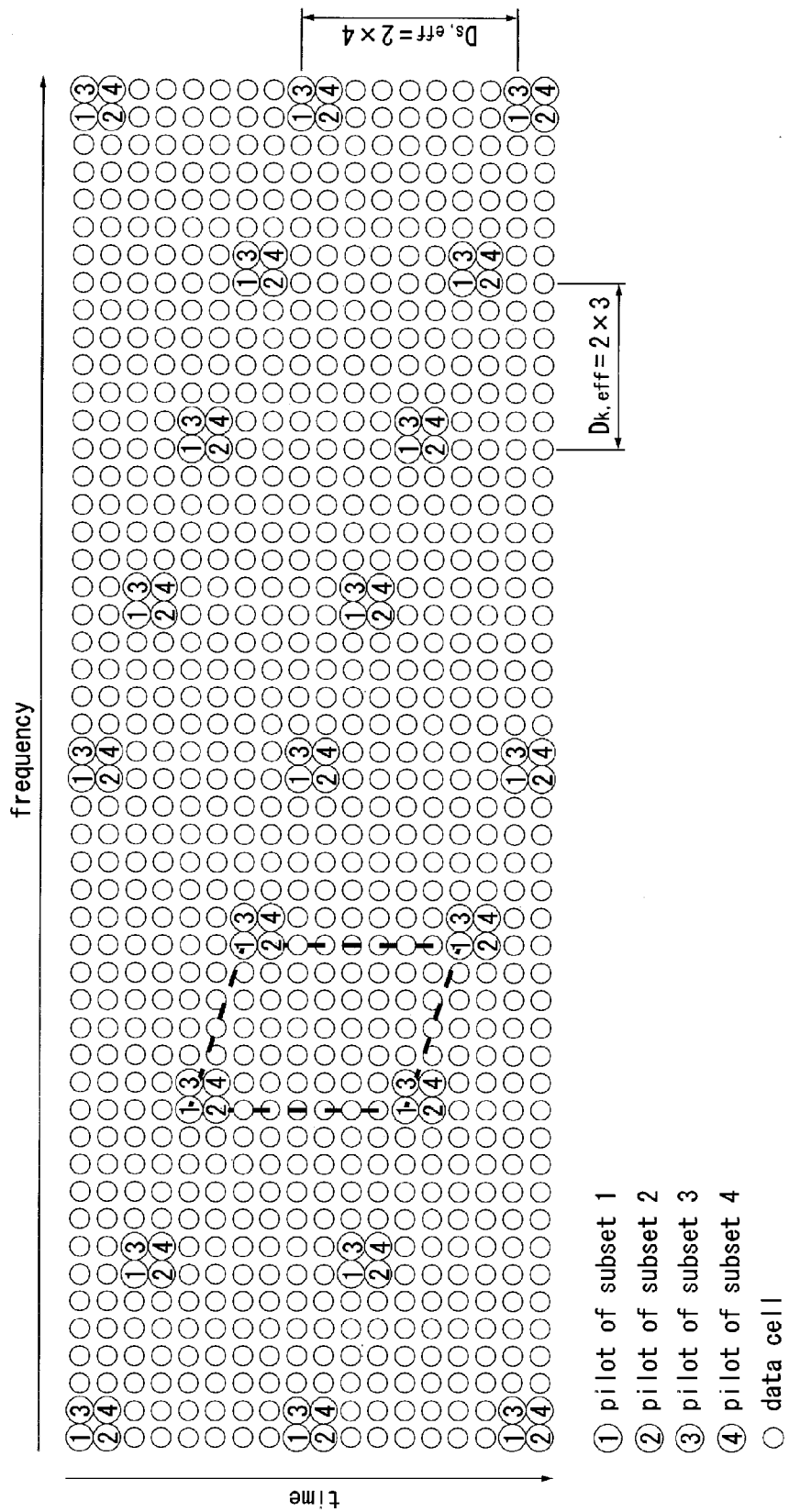
FIG. 6 shows a conventional SP pattern for four transmitters (transmit antennas) and grouped interleaving in time and frequency.

Hence, the inventive SP pattern of FIG. 7 provides a finer granularity in the distribution of scattered pilots of the same subset than the conventional SP patterns shown in FIGS. 3 and 5.

Figure 8:
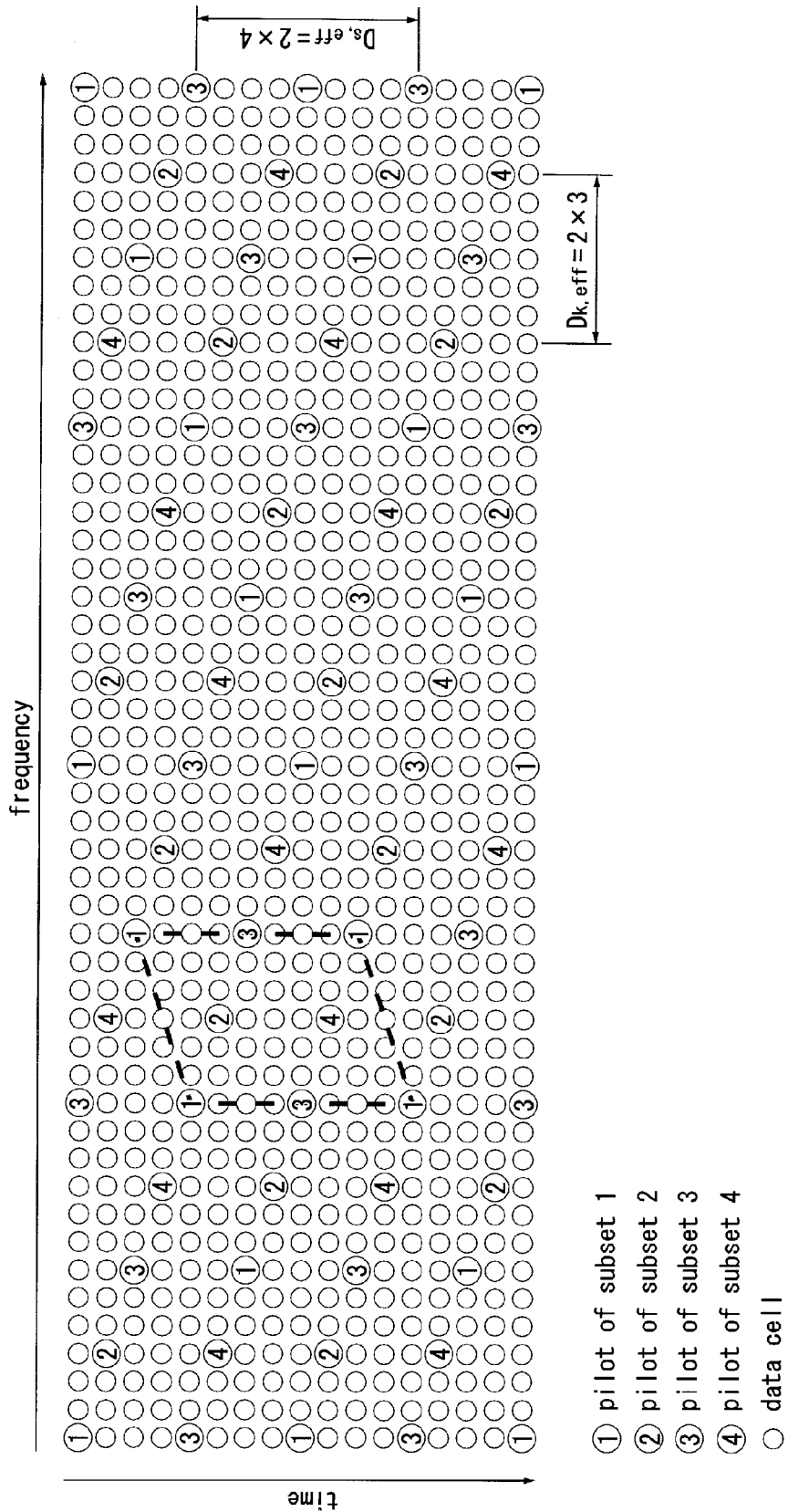
FIG. 8 shows another SP pattern for four transmitters (transmit antennas) and equally-spaced interleaving in time and frequency in accordance with an embodiment of the present invention.

FIG. 8 shows another SP pattern for four transmitters and equally-spaced interleaving in time and frequency in accordance with another embodiment of the present invention. In this SP pattern, similar granularity is maintained both in time and frequency. This SP pattern is in many aspects similar to that of FIG. 7 and achieves the same advantages. A repetition of the detailed explanations provided in connection with FIG. 7 is therefore omitted.

The advantages of the inventive SP patterns become even more apparent by comparing "unit cells" of the SP lattices. A unit cell, originally defined in the context of crystallography, is the smallest unit of a lattice from which the entire (periodic) lattice may be reconstructed by means of translations only. Unit cells of the SP patterns are indicated by dashed lines in FIGS. 2 to 8. Obviously, the unit cells of the SP patterns shown in FIGS. 7 and 8 are more compact than those of FIGS. 3 and 5, which are more extensive in either the frequency (FIG. 3) or the time direction (FIG. 5).

Figure 11:
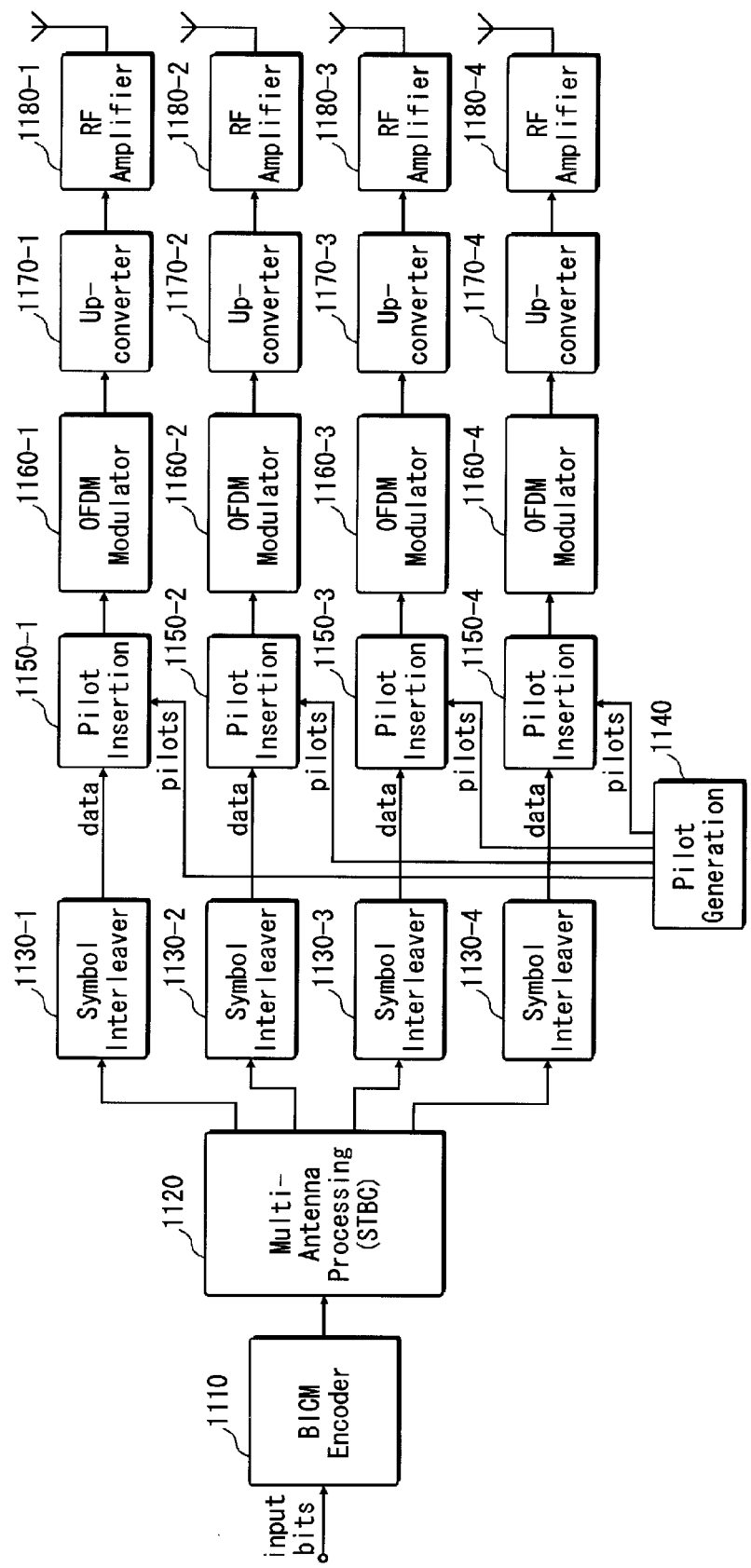
FIG. 11 shows an exemplary block diagram of a multi-antenna OFDM transmitter.
Figure 13:
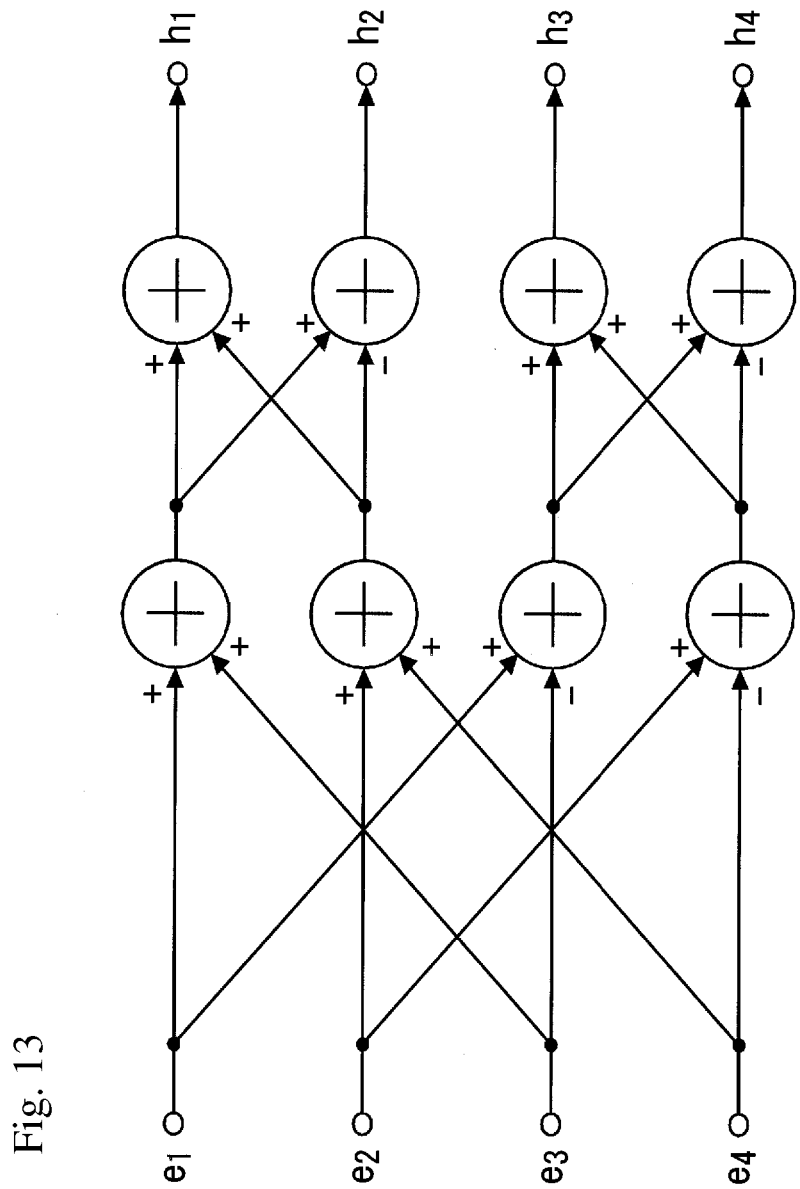
FIG. 13 illustrates the fast Hadamard transform.

FIG. 11 shows a block diagram for a multi-antenna OFDM transmitter using scattered pilots. The bits to be transmitted are fed at the input of an encoder 1110. In the encoder 1110, these bits undergo a BICM (bit-interleaved coding and modulation) encoding, which produces complex symbols at its output. The BICM encoding consists of three basic steps: 1) FEC (forward error correction) encoding, 2) bit interleaving, and 3) modulation. Such a process is well known in the art. The FEC code is typically an LDPC (low-density parity check) code or a Turbo code, and the modulation is typically QAM (quadrature amplitude modulation).

The complex symbols produced by the BICM encoder 1110 are fed to a multi-antenna processor 1120, wherein they undergo a multi-antenna encoding, whereby the input stream is encoded to generate multiple parallel streams of equal data rate, one for each transmitter/antenna. The output streams carry exactly the same information as the input streams. Typically an STBC (space-time block code) is used for this purpose. There are many STBC variants known in the art.

The complex symbols produced by the STBC encoding are then mapped onto the time-frequency OFDM grid, according to a specific algorithm, which does not make the object of the present invention. The output of the mapping process consists of OFDM symbols, which in turn consist of complex OFDM cells. The cells are then interleaved by a set of symbol interleavers (1130-1, 1130-2, 1130-3, 1130-4) in order to improve the frequency diversity of the encoded data. Such interleaving is well known in the art and is also referred to as frequency interleaving since the OFDM symbols span the available frequency bandwidth. The mapping and interleaving are identical for all transmitters/antennas.

Following the OFDM symbol interleaving, the scattered pilots (SP) are generated by pilot generation unit 1140 and inserted by a set of pilot insertion units (1150-1, 1150-2, 1150-3, 1150-4). The SPs are not the same for all transmitters/antennas. Each of the pilot insertion units inserts the input SPs into the OFDM signals so as to achieve, for example, the symbol patterns shown in FIGS. 7 and 8. In order to be able to estimate the individual channel components, the SPs are partitioned into as many subsets as there are transmitters/antennas. All pilots belonging to a subset are multiplied by a constant coefficient that depends on the subset and the transmitter (transmit antenna). In the four-transmitter case, there are 16 coefficients, which can be expressed as a 4×4 matrix, as shown in FIGS. 12A and 12B. The rows correspond to the transmitters (transmit antennas) and the columns to the SP subsets.

The resulting OFDM symbols including data cells and pilot cells are then fed to the OFDM modulators (1160-1, 1160-2, 1160-3, 1160-4), followed by up-converters (1170-1, 1170-2, 1170-3, 1170-4), RF-amplifiers (1180-1, 1180-2, 1180-3, 1180-4), and finally transmitted via transmit antennas.

Figure 9:
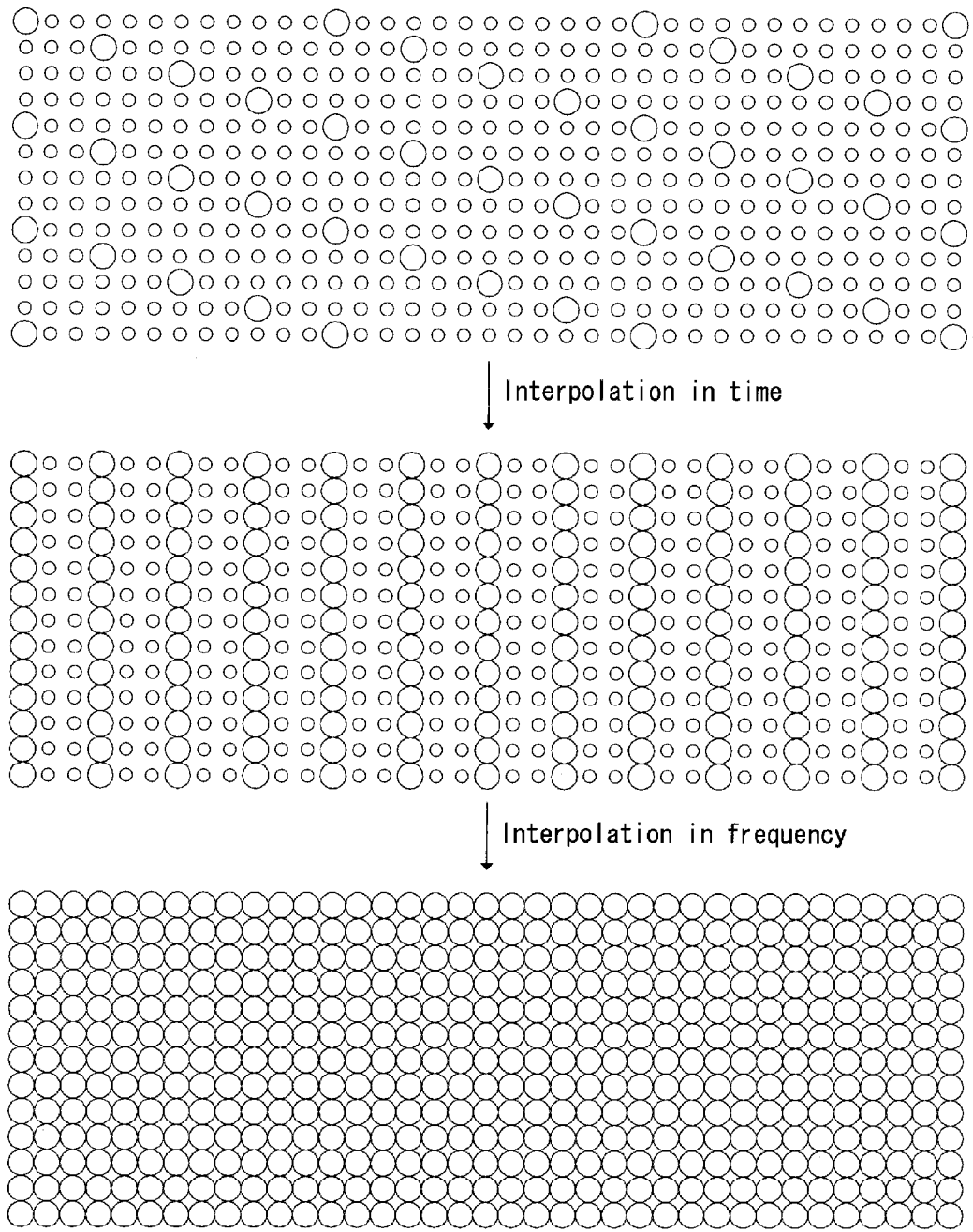
FIG. 9 illustrates the channel estimation process for the single-transmitter case, using separable interpolation in time and frequency.
Figure 10:
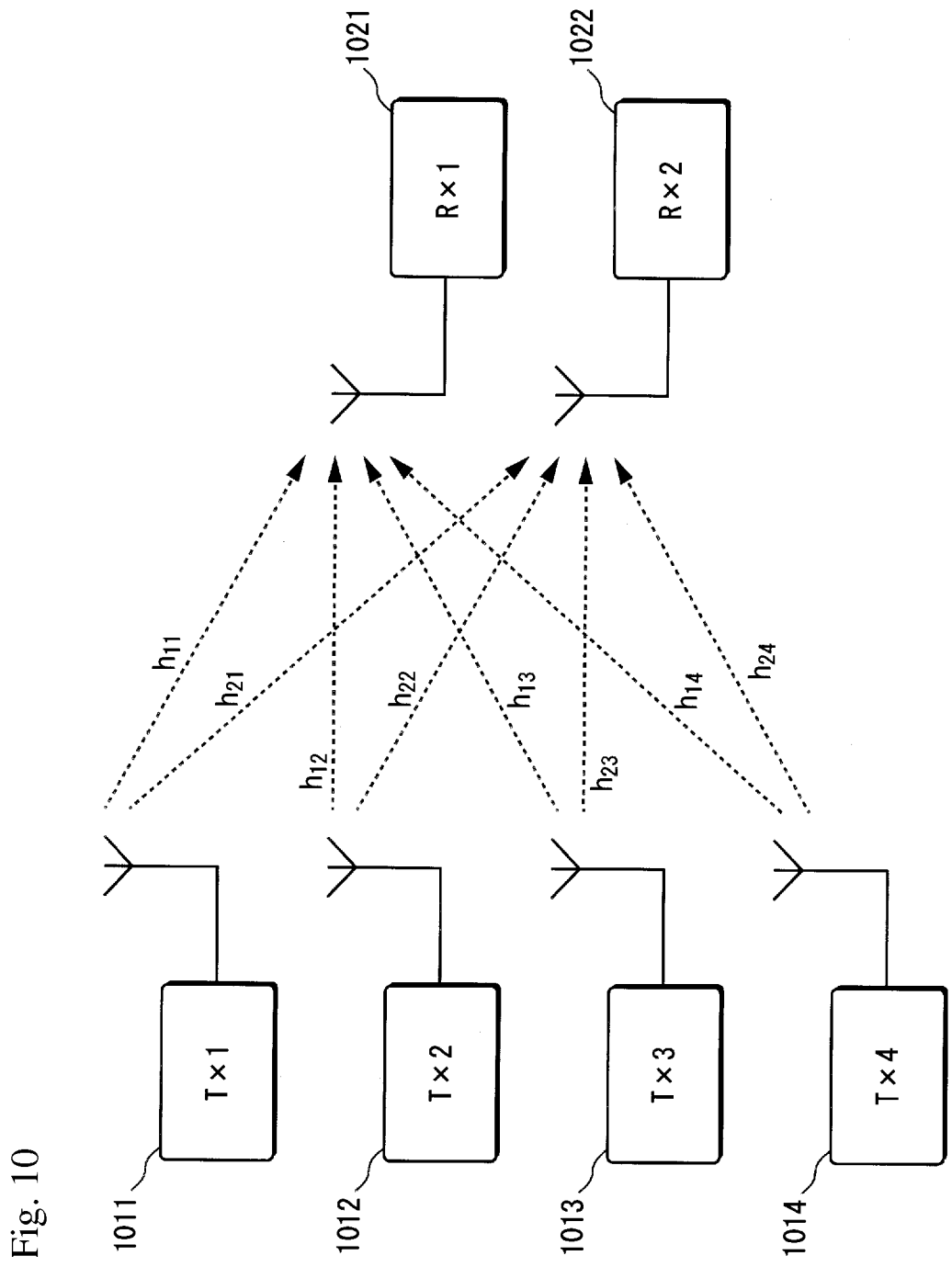
FIG. 10 shows the receivers, transmitters, and the eight channel components in a 4×2 MIMO configuration.
Figure 14:
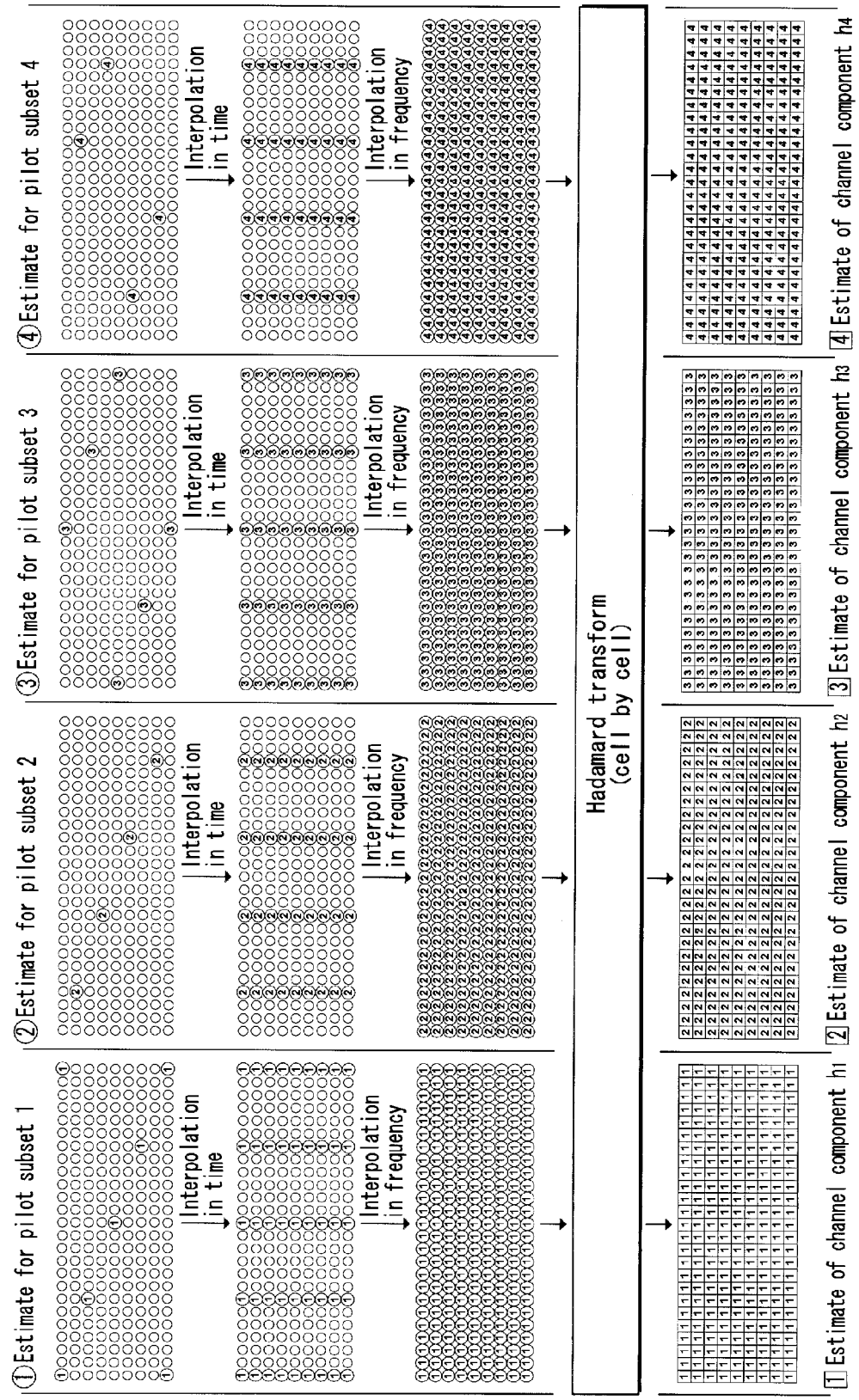
FIG. 14 is an illustration of the channel estimation process in a receiver for 4-transmitter OFDM.

On the receiver side, the channel estimation process is similar to that used in the single-transmitter case in FIG. 9. Instead of one channel estimation process, however, four will be performed in parallel, one for each SP subset, as shown in FIG. 14. If a pilot encoding is used, e.g. Hadamard, an additional processing step, e.g. Hadamard transform, is required in order to separate the four channel components. This processing step is performed for each OFDM cell independently.

Figure 15:
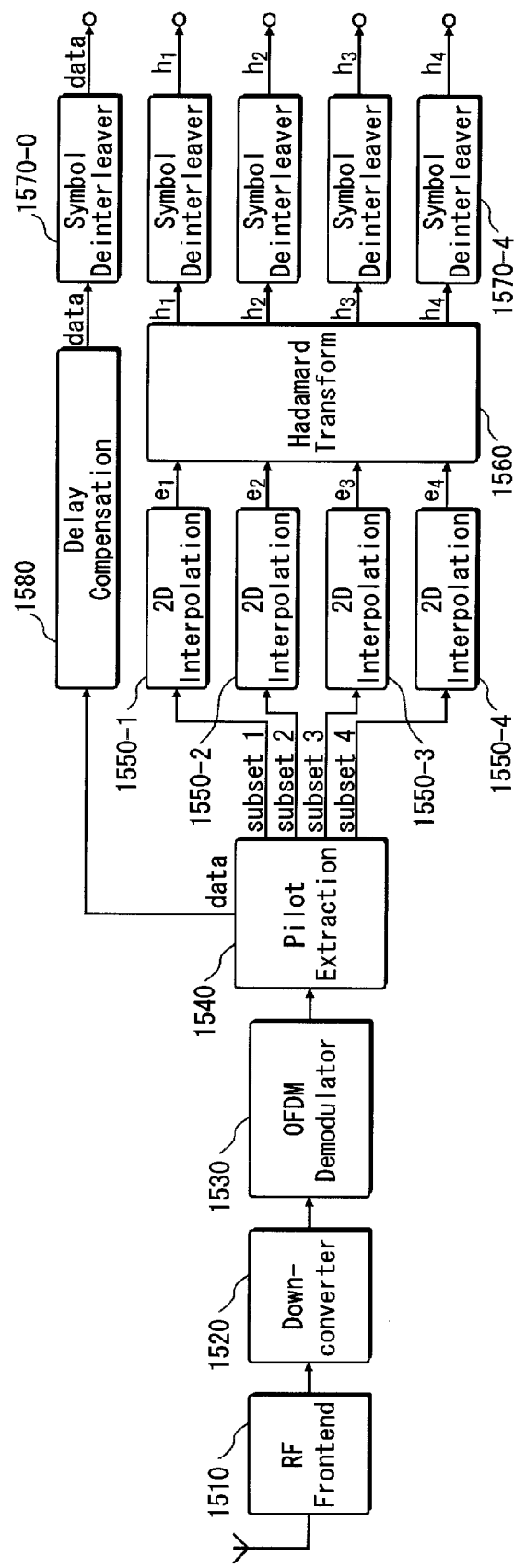
FIG. 15 shows a block diagram of a receiver for 4-transmitter OFDM, corresponding to the process of FIG. 14.

A possible receiver block diagram for the OFDM-specific part is shown in FIG. 15. A pilot extraction unit 1540, 2D interpolation units (1550-1, 1550-2, 1550-3, 1550-4), and a Hadamard transform unit 1560 shown in FIG. 15 perform the process of FIG. 14.

An RF-frontend 1510 receives an RF signal, which is fed to a down converter 1520. The down converter 1520 performs downconversion on the RF signal, which is then fed to OFDM demodulator 1530. This RF signal fed from the down converter 1520 is demodulated by the OFDM demodulator 1530. From the demodulated signal, the pilots are extracted by pilot extraction unit 1540. The pilot extraction unit 1540 is adapted for partitioning the extracted pilots into subsets in accordance with the inventive SP patterns described above. Signals other than the pilots are output as data signals. The pilots of each of these subsets are then fed to a corresponding one of a set of the 2D interpolation units (1550-1, 1550-2, 1550-3, 1550-4). It is to be noted that the two distinct interpolation steps are merged into a single block "2-D interpolation". The signals obtained through the interpolation performed by the 2D interpolation units (1550-1, 1550-2, 1550-3, 1550-4) are fed to the transform unit 1560 and converted into channels. Depending on how the pilots of different subsets are encoded, a Hadamard transform is applied in the transform unit 1560 in order to extract the channel estimates $h_1, \ldots, h_4$. A delay compensation unit 1580 is provided on the data path, and compensates for a group delay introduced by the interpolation process based on the pilots in each subset. By thus compensating for a data delay, the delay compensation unit 1580 realigns data and channels in each of symbol deinterleavers (1570-1, 1570-2, 1570-3, 1570-4).

Figure 16:
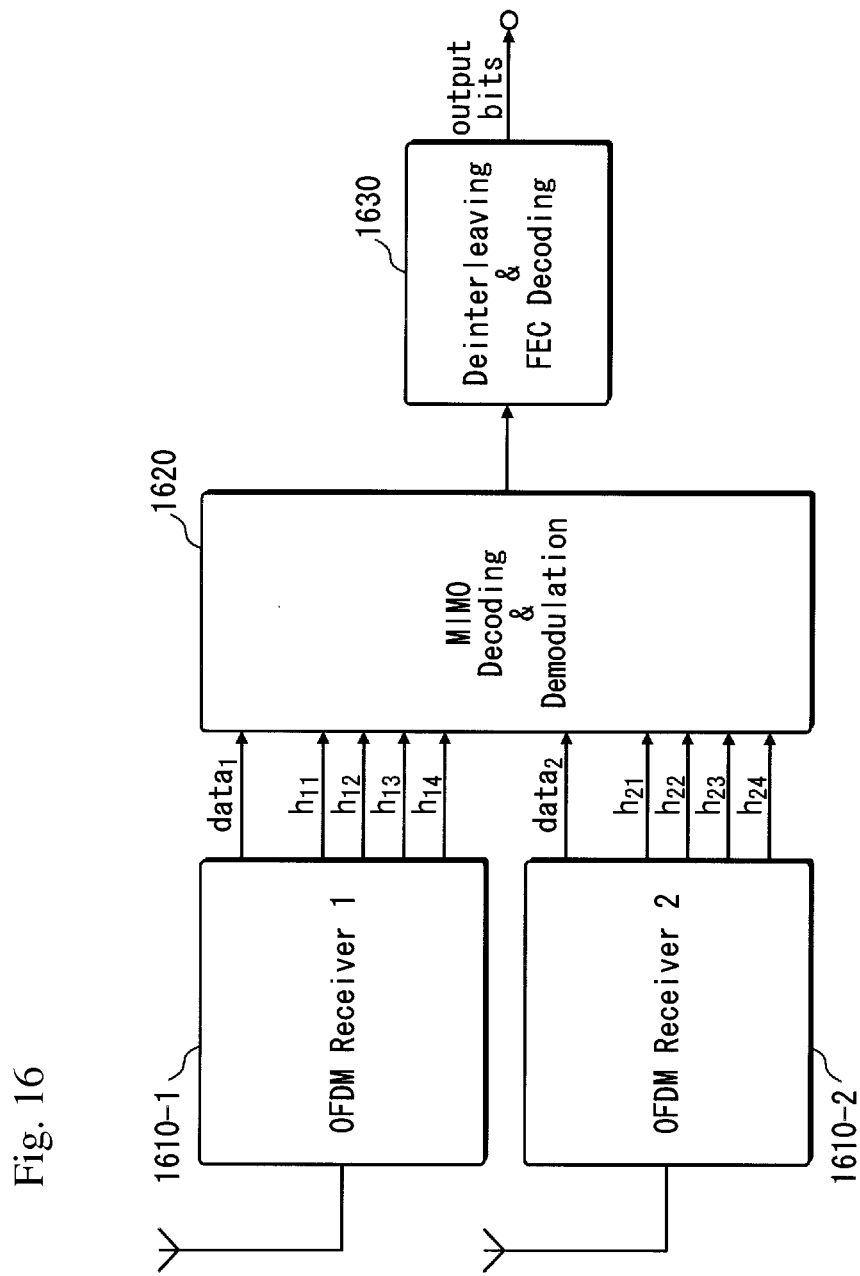
FIG. 16 shows a receiver configuration for 4×2 MIMO, where each OFDM receiver provides its own channel estimates to the MIMO decoding stage.

The MIMO and BICM decoding are not OFDM specific, but require the data and the associated channel estimates from all receivers/antennas. The actual decoding architecture strongly depends on the particular STBC, as well as on the desired reception performance. Optimal results are obtained when the complex symbols encoded in an STBC block are decoded and demodulated jointly. FIG. 16 shows an exemplary block diagram containing two OFDM receivers 1610-1 and 1610-2 feeding a common MIMO and BICM decoding stage 1620.

According to a further aspect of the present invention, modified continual pilots (CP) are inserted into the SP pattern. Conventional CPs are pilots that are present in every symbol on a given subcarrier. They can be located on an SP-bearing subcarrier or on a non-SP-bearing subcarrier and are generally not subject to any additional processing. According to the present invention, however, the CPs are also partitioned into subsets like the SPs.

Figure 17:
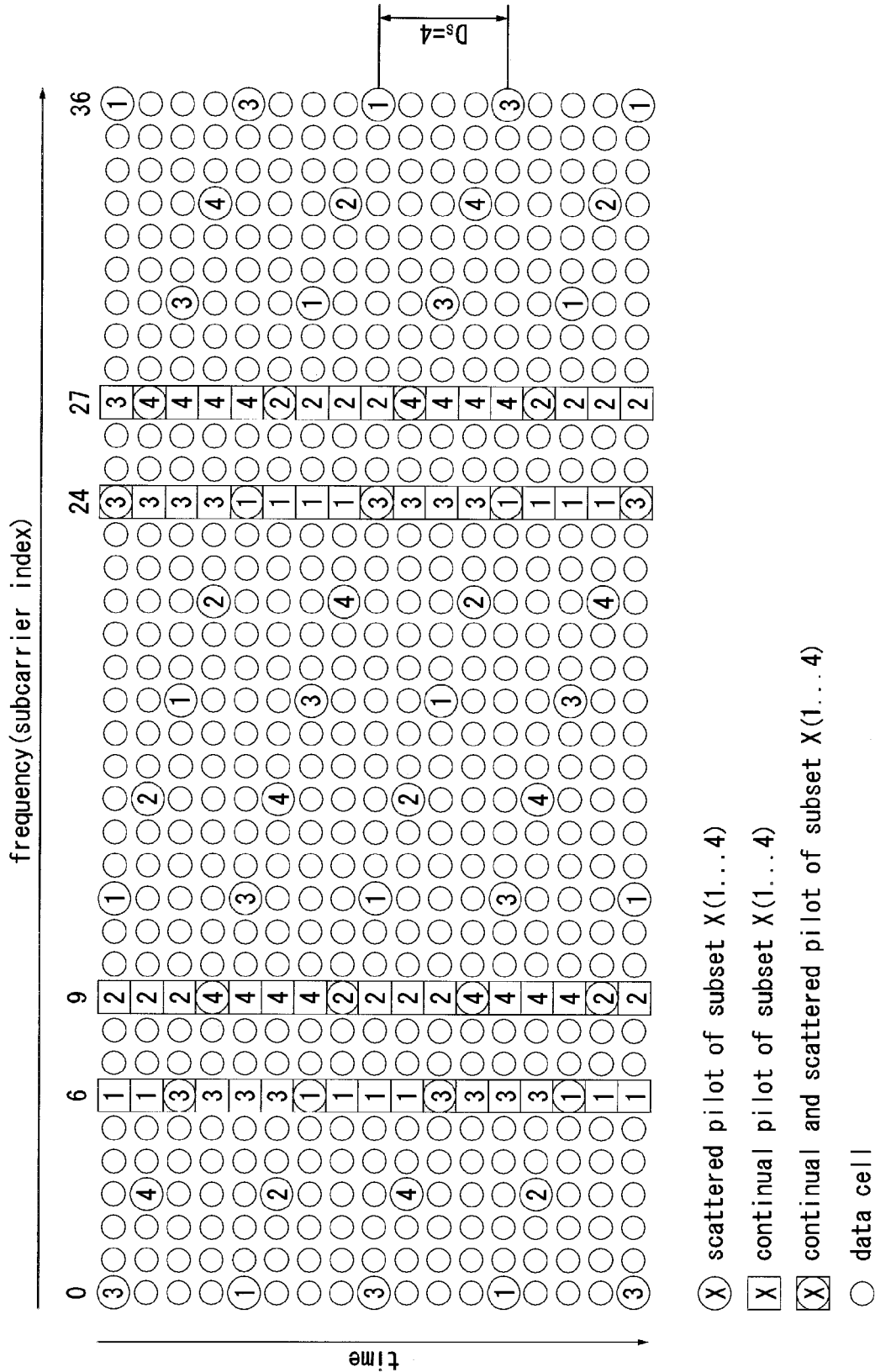
FIG. 17 shows an example of an inventive SP pattern with additional continual pilots located on SP-bearing subcarriers.

FIG. 17 shows an example of an inventive SP pattern with additional continual pilots located on SP-bearing subcarriers. The CPs on a given SP-bearing subcarrier are partitioned into the two subsets the SPs of that subcarrier belong to. In the figure, the continual pilots are represented by rectangles and scattered pilots by large circles. OFDM cells that are used both for scattered and continual pilots are represented by a combination of a circle and a rectangle. Numerals indicate the corresponding subset.

The CP partitioning is performed so that those CPs that are also SPs will not change their subset. Moreover, the CP partitioning must be balanced between the two subsets, and the number of transitions in subsets to which the CPs belong must be minimized along the time axis (symbol direction). These constraints lead to a partitioning consisting of alternating contiguous groups of $D_s$ CPs, as in FIG. 17 (subcarriers 6, 9, 24, 27). The main feature is that, with respect to the CPs, there is a subset change every $D_s$ pilots. The locations where the subsets of the CPs change are not limited to the ones shown in FIG. 17. There are $D_s$ possibilities to choose from as candidates for such positions.

Figure 18:
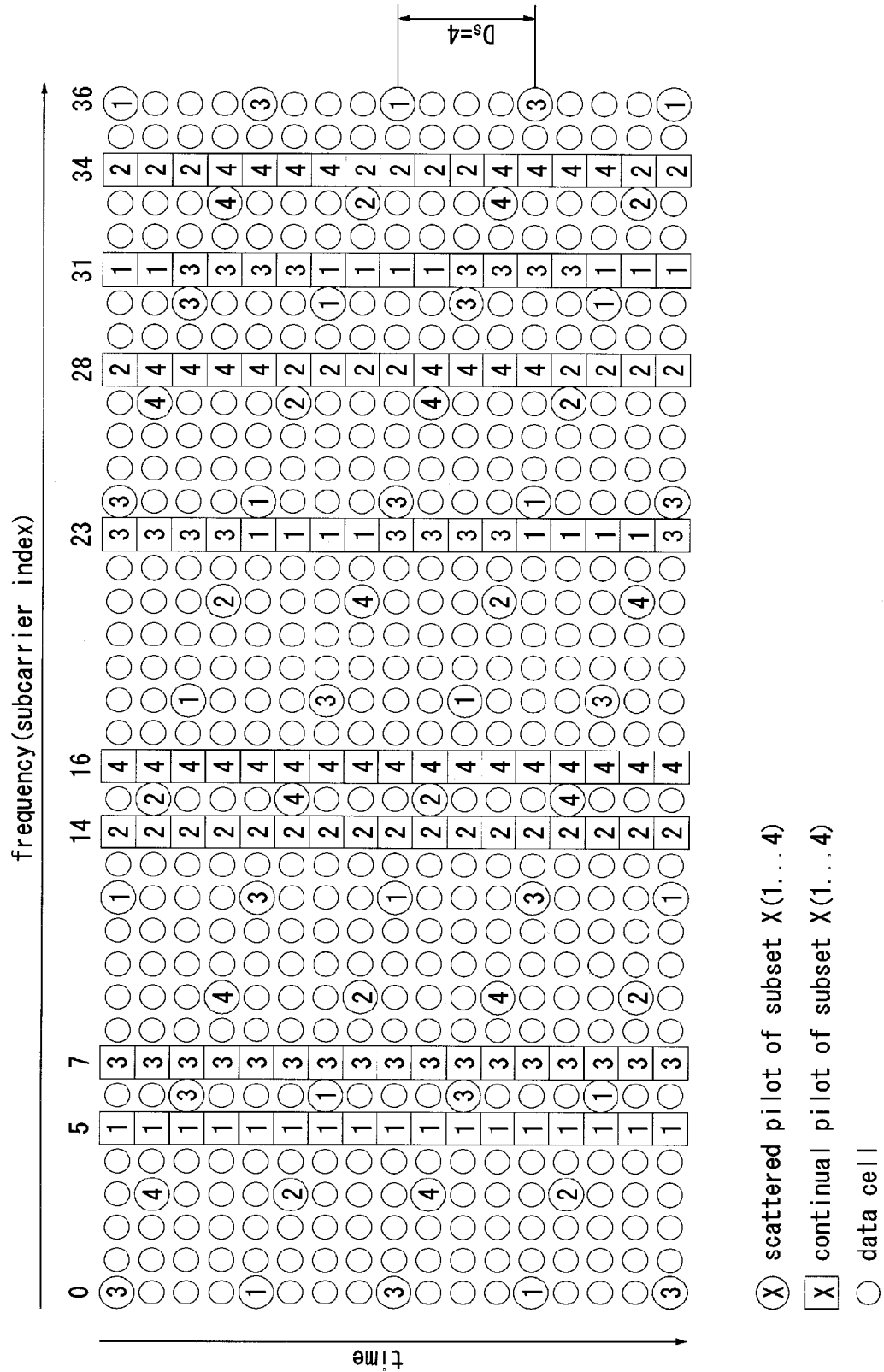
FIG. 18 shows another example of an inventive SP pattern with additional continual pilots located on non-SP-bearing subcarriers.

FIG. 18 shows, in a manner similar to FIG. 17, an example of an inventive SP pattern with additional continual pilots located on non-SP-bearing subcarriers.

For the CPs on non-SP-bearing subcarriers there are two possibilities. First, all CPs on the same subcarrier may be kept in one subset, as it is illustrated in FIG. 18 for subcarriers 5, 7, 14, and 16. Second, two subsets of pilots may be alternated on each subcarrier in a manner similar to that for SP-bearing subcarriers, as it is illustrated in FIG. 18 for subcarriers 23, 28, 31, and 34. Preferably, the CPs are evenly distributed among the four subsets.

Summarizing, the present invention relates to orthogonal frequency-division multiplexing (OFDM) communication systems with multiple (e.g., four) transmit antennas and one or more receivers/antennas for transmitting and receiving OFDM signals, and in particular to methods for inserting scattered pilots (SPs) into the transmit signals of such OFDM systems, for estimating channel properties on the basis of the scattered pilots, a multi-antenna OFDM transmitter, and an OFDM receiver. In this context, it is the particular approach of the present invention to keep the same SP pattern like in the single-transmitter case, to partition the pilots into as many subsets as there are transmit antennas, and to interleave these subsets both in time and in frequency. In this manner, the granularity of pilots of the same subset is reduced. This offers increased flexibility in designing the scattered pilot patterns and greater accuracy of the estimated channel properties.

Supplementary Notes

The implementation methods pertaining to the present invention are not limited to those described in the above embodiments. The following explains variations of conceptions of the present invention.

(1) The above embodiments have not provided detailed descriptions of the signals transmitted by each antenna. Described below are SPs in the signals transmitted by each antenna.

FIGS. 19 to 22 each show the SP pattern of the signals transmitted by each antenna in the case of four-antenna transmission. Here, in encoding the SPs, the SPs are multiplexed by the coefficients shown in the matrix of FIG. 12A.

Figure 19:
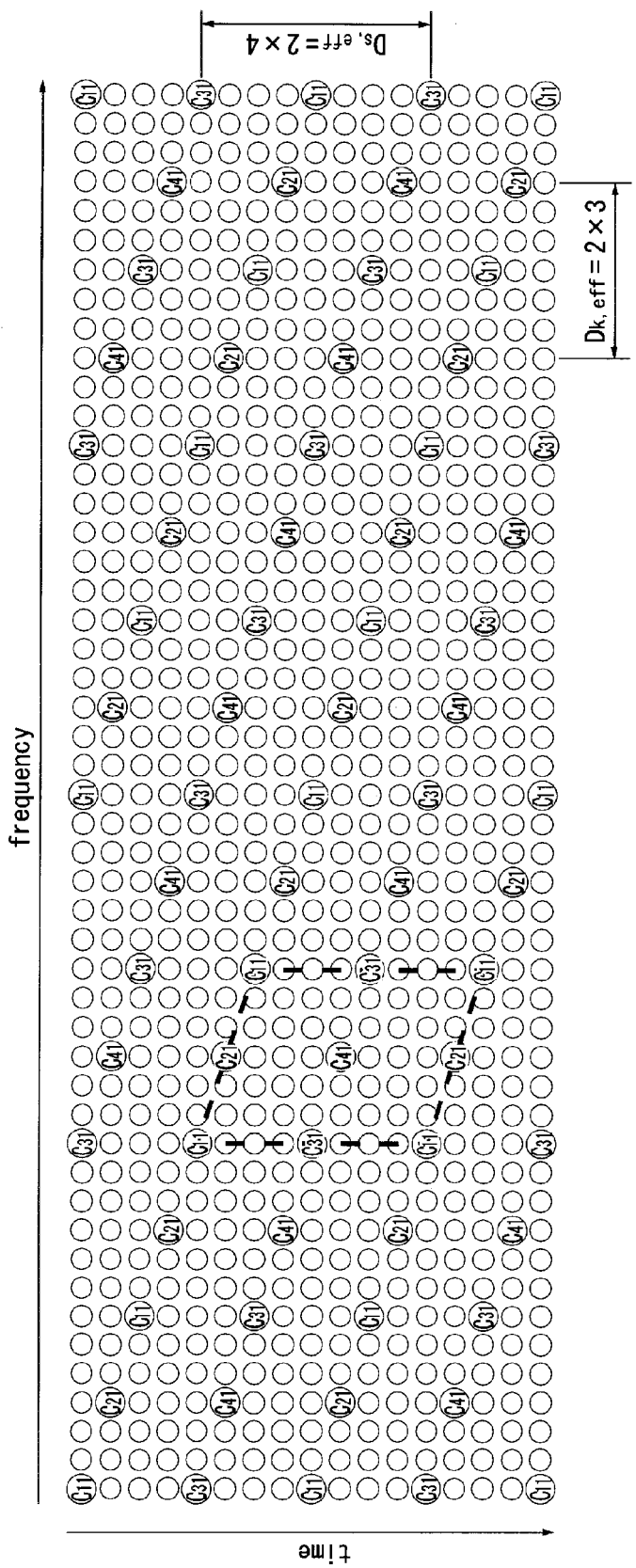
FIG. 19 shows an inventive SP pattern of signals transmitted from the first antenna and coefficients by which the SPs are multiplied.

FIG. 19 shows a symbol pattern of the signals transmitted by a first antenna (so named for convenience), which is one of the four antennas. As is apparent from the comparison between FIG. 19 and FIG. 7, which shows the symbol pattern pertaining to the present invention, the SPs belonging to the subsets indicated by the numbers 1, 2, 3 and 4 in FIG. 7 are respectively multiplied by the coefficients $C_{11}$, $C_{12}$, $C_{13}$ and $C_{14}$ corresponding to the first antenna as shown in FIG. 12A.

Figure 20:
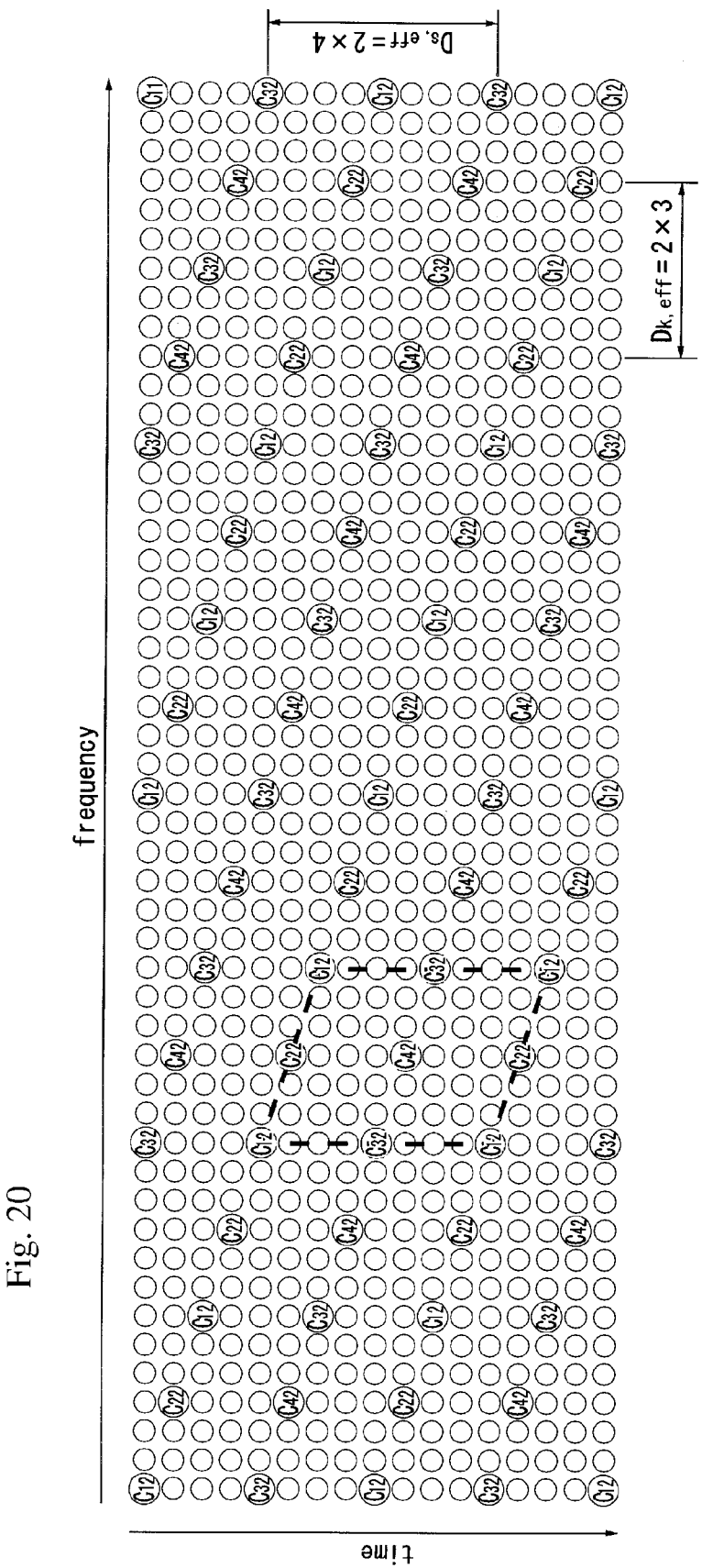
FIG. 20 shows an inventive SP pattern of signals transmitted from the second antenna and coefficients by which the SPs are multiplied.
Figure 21:
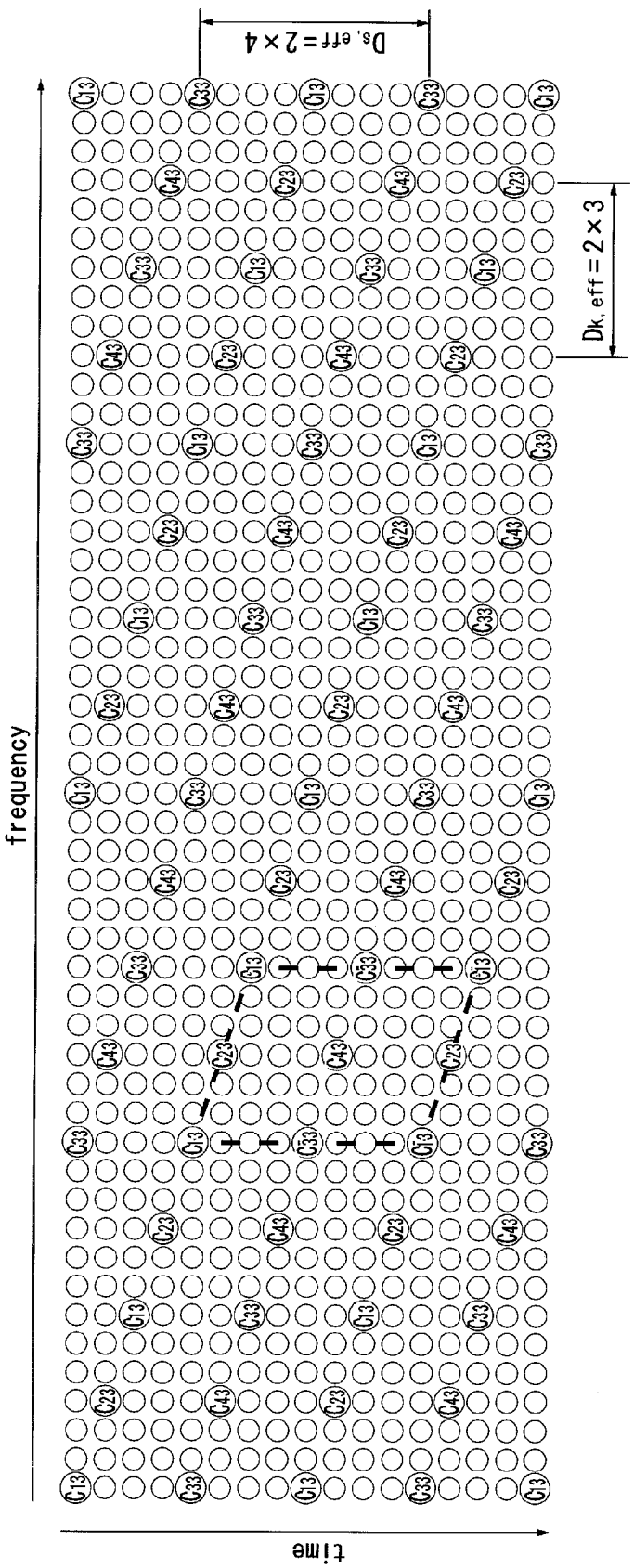
FIG. 21 shows an inventive SP pattern of signals transmitted from the third antenna and coefficients by which the SPs are multiplied.
Figure 22:
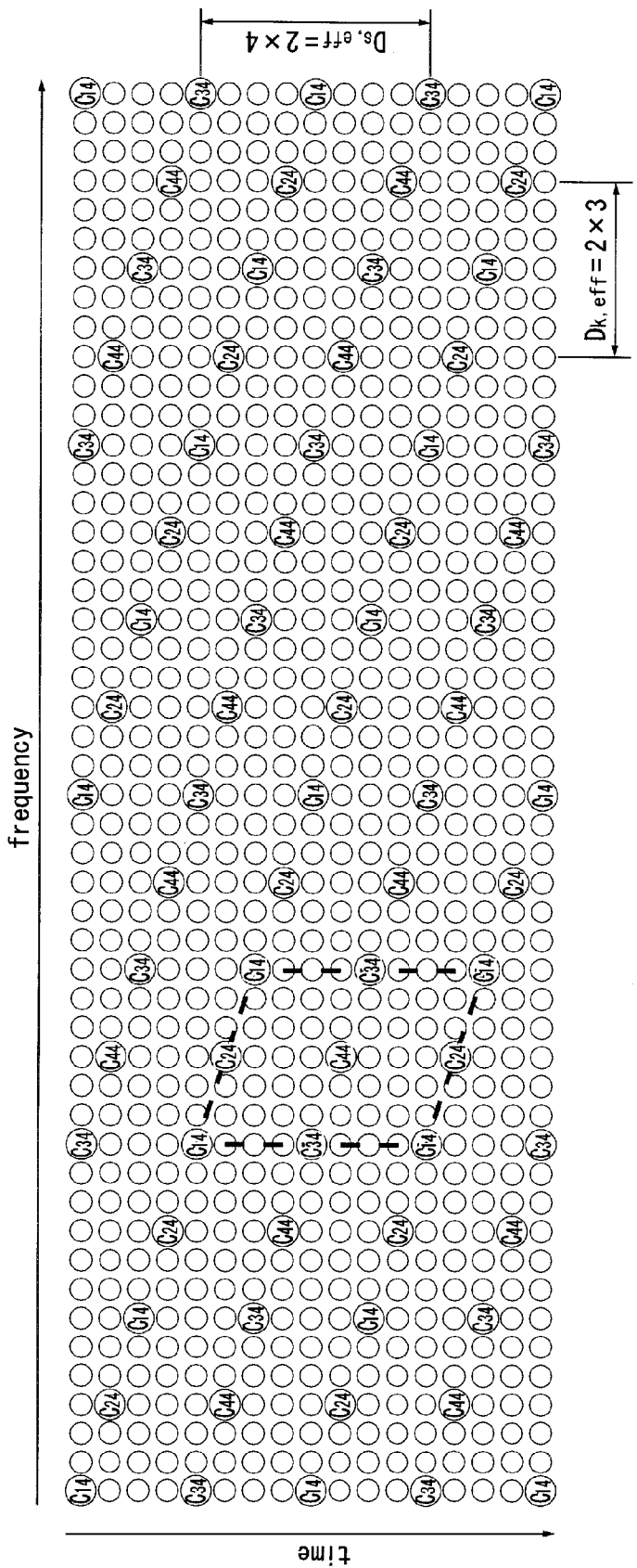
FIG. 22 shows an inventive SP pattern of signals transmitted from the fourth antenna and coefficients by which the SPs are multiplied.

Meanwhile, FIGS. 20, 21 and 22 respectively show symbol patterns of the OFDM signals to be transmitted by the second antenna, the third antenna and the fourth antenna.

As is apparent from the comparison between FIGS. 19 and 20, SPs that are multiplied by the coefficient $C_{12}$ in the signals transmitted by the second antenna are located in the positions of SPs that are multiplied by the coefficient $C_{11}$ in the signals transmitted by the first antenna. Pilots that are multiplied by the coefficients $C_{13}$ and $C_{14}$ in the signals transmitted by the third and fourth antennas (respectively shown in FIGS. 21 and 22) are also located in such positions.

As indicated by the signals shown in FIGS. 19 to 22, which are respectively transmitted by the four antennas, the SPs included in the signals correspond to a different one of the antennas, and are periodically arranged in such a manner that two adjacent SPs belonging to one subset are spaced with an SP belonging to another subset arranged therebetween, both in time and in frequency.

(2) The above embodiments have described the case where the number of subsets is four. However, the number of subsets is not limited to four, but may be any number that is a product of numbers $M_s$ (an integer greater than or equal to two) and $M_k$ (an integer greater than or equal to two).

At this time, the distance between two adjacent pilots belonging to the same subset in one subcarrier is $D_s \times M_s$, based on $D_s$ and $M_s$ described in the above embodiments. The distance between two adjacent subcarriers including pilots belonging to the same subset is $D_k \times M_k$.

Figure 23:
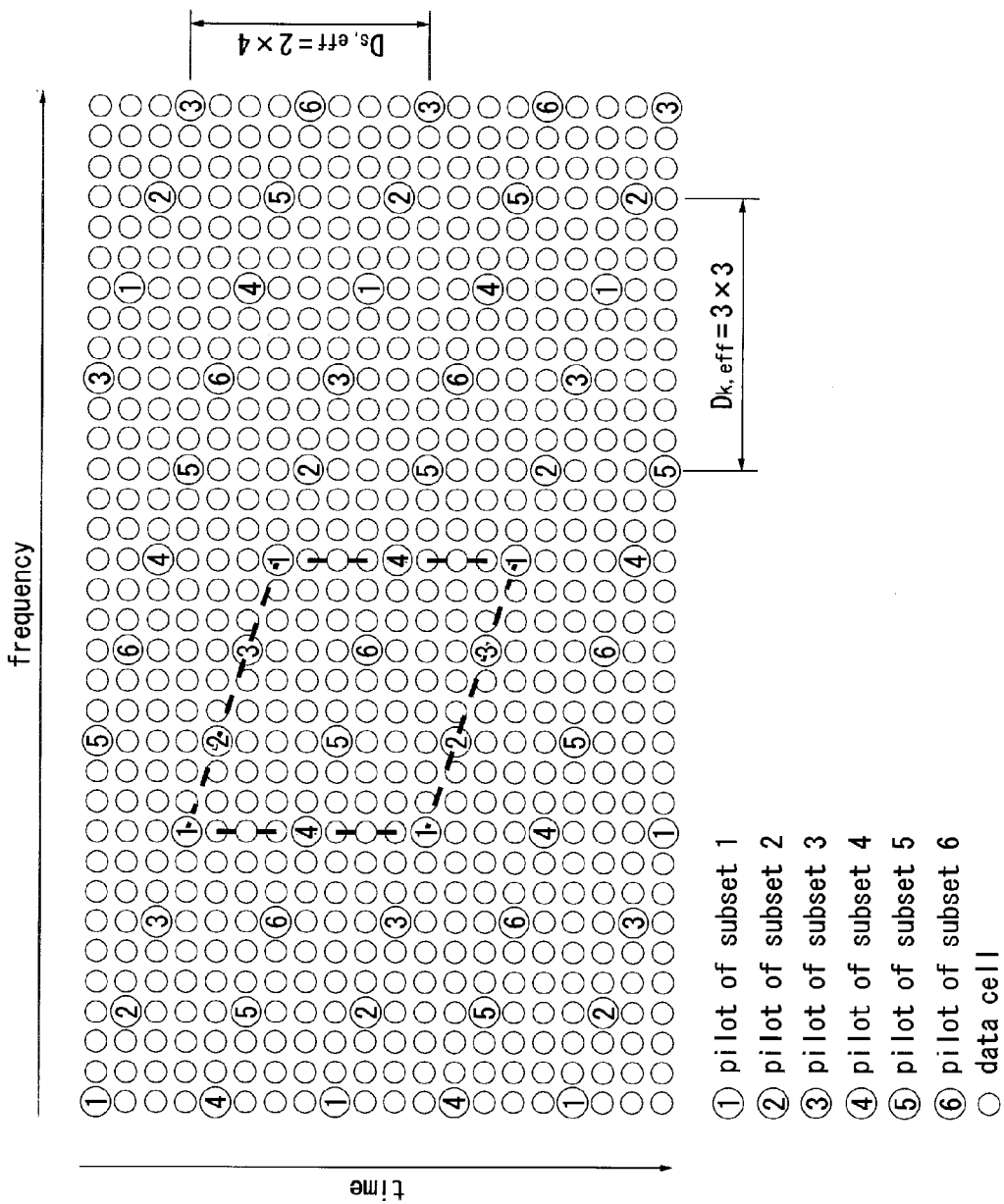
FIG. 23 shows an inventive SP pattern where there are six subsets, with equally-spaced interleaving in both time and frequency.

As one example, $M_s=2$ and $M_k=3$. In this case, the SP pattern is the same as, for instance, the one shown in FIG. 23. In other words, SPs belonging to each subset should be arranged as shown in FIG. 23.

Figure 24:
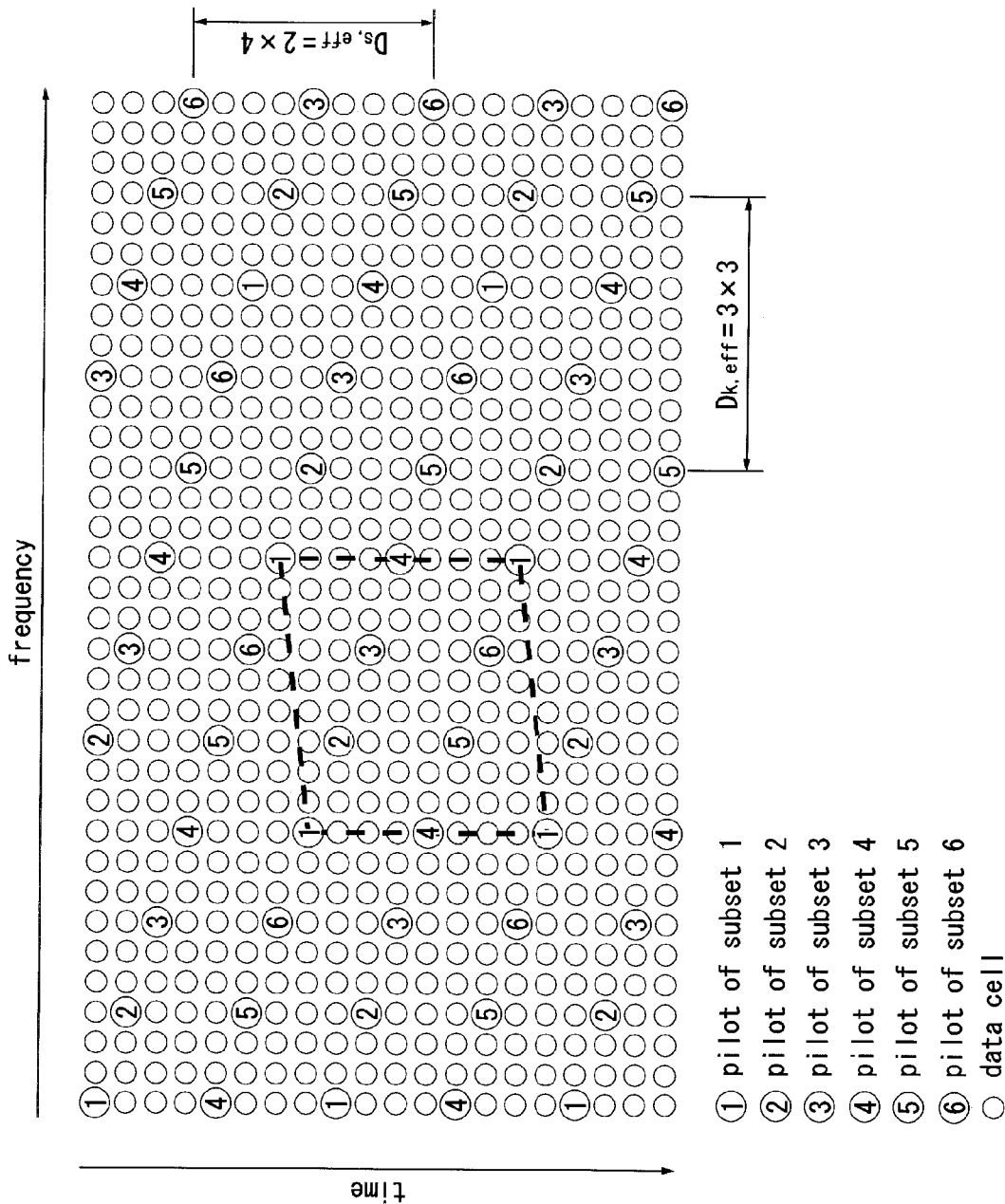
FIG. 24 shows an inventive SP pattern where there are six subsets, with equally-spaced interleaving in both time and frequency.
Figure 25:
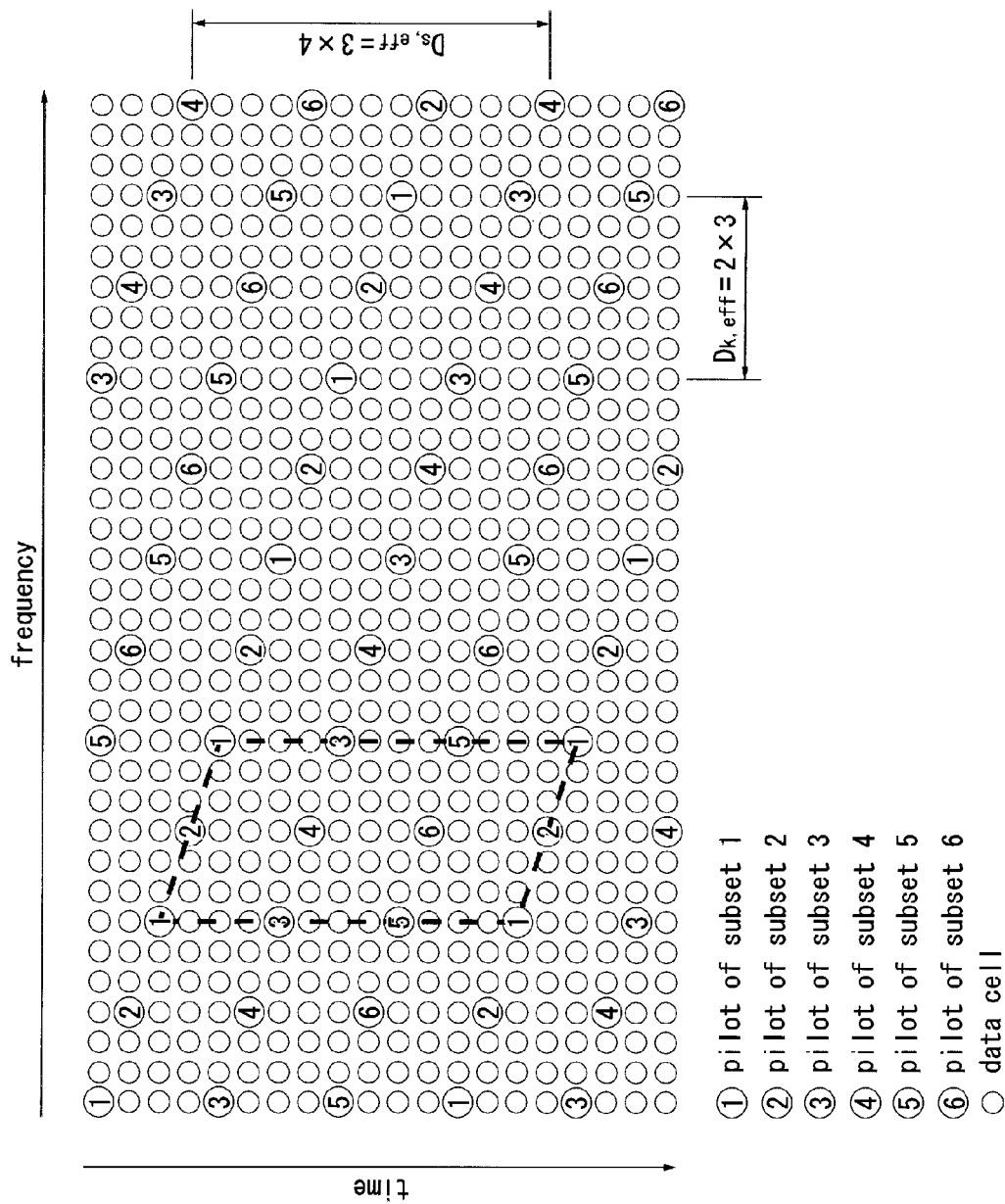
FIG. 25 shows an inventive SP pattern where there are six subsets, with equally-spaced interleaving in both time and frequency.
Figure 26:
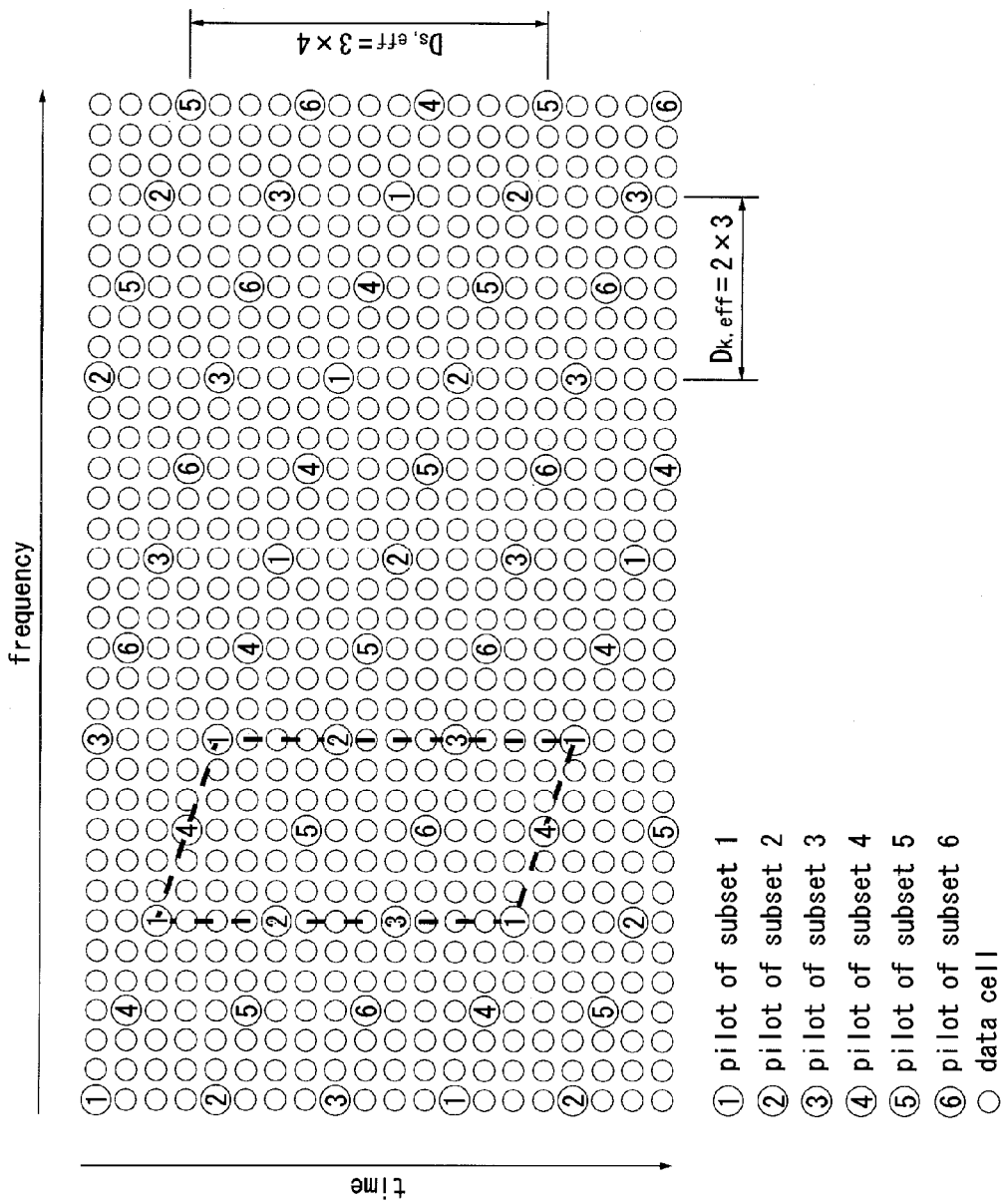
FIG. 26 shows an inventive SP pattern where there are six subsets, with equally-spaced interleaving in both time and frequency.

As another example, in a case where $M_s=2$ and $M_k=3$, SPs belonging to each subset may be arranged as shown in, for example, FIGS. 24 to 26. In this case, it is preferable that information indicating which one of the SP patterns should be used be either preset in each receiver, or notified to each receiver by the transmitters. FIGS. 25 and 26 show examples of an SP pattern with $M_s=3$ and $M_k=2$.

(3) In the above embodiments, methods of encoding the SPs using the Hadamard transform, as shown in FIG. 12, have been described. However, the SPs may be encoded using any orthogonal transform method with use of a unitary diagonal matrix as has been described in Background Art, the Fourier transform matrix shown in the following Math. 8, and the like. It should be noted that since an inverse of the orthogonal transform matrix must exist, the orthogonal transform matrix must be full rank.

$$\begin{bmatrix} e^{j2\pi\frac{0}{4}} & e^{j2\pi\frac{0}{4}} & e^{j2\pi\frac{0}{4}} & e^{j2\pi\frac{0}{4}} \\ e^{j2\pi\frac{0}{4}} & e^{j2\pi\frac{1}{4}} & e^{j2\pi\frac{2}{4}} & e^{j2\pi\frac{3}{4}} \\ e^{j2\pi\frac{0}{4}} & e^{j2\pi\frac{2}{4}} & e^{j2\pi\frac{4}{4}} & e^{j2\pi\frac{6}{4}} \\ e^{j2\pi\frac{0}{4}} & e^{j2\pi\frac{3}{4}} & e^{j2\pi\frac{6}{4}} & e^{j2\pi\frac{9}{4}} \end{bmatrix} \quad [\text{Math. 8}]$$

In a case where SPs to be transmitted by N transmit antennas are encoded after being partitioned into N subsets, the Fourier transform matrix shown in Math. 9 may be used.

$$\begin{bmatrix} e^{j2\pi\frac{0}{N}} & e^{j2\pi\frac{0}{N}} & \cdots & e^{j2\pi\frac{0}{N}} \\ e^{j2\pi\frac{0}{N}} & e^{j2\pi\frac{1}{N}} & \cdots & e^{j2\pi\frac{N-1}{N}} \\ \vdots & \vdots & \ddots & \vdots \\ e^{j2\pi\frac{0}{N}} & e^{j2\pi\frac{N-1}{N}} & \cdots & e^{j2\pi\frac{(N-1)(N-1)}{N}} \end{bmatrix} \quad [\text{Math. 9}]$$

(4) In the above embodiments, the number of the transmitters (transmit antennas) has been described as the same as the number of subsets, i.e., four. It should be noted, however, that the number of the transmitters (transmit antennas) may be smaller than or equal to the number of the subsets.

As one example, the number of subsets and the number of transmitters (transmit antennas) may be four and three, respectively. As another example, the number of subsets and the number of transmitters (transmit antennas) may be six and five, respectively. That is to say, the number of subsets and the number of transmitters (transmit antennas) may be arbitrary, as long as each receiver can distinguish the signals transmitted by the respective transmitters (transmit antennas).

For instance, in a case where the number of subsets and the number of transmitters (transmit antennas) are four and three, respectively, provided that the matrix shown in FIG. 12A is used, the coefficients in a column corresponding to one of the antennas are not used, and three other antennas transmit the OFDM signals in which are arranged SPs multiplied by the coefficients in the columns corresponding to these three other antennas. For example, assume a case where the fourth antenna shown in FIG. 12A does not exist. In this case, (i) the first antenna transmits the OFDM signals in which are arranged SPs multiplied by the coefficients $C_{11}$, $C_{21}$, $C_{31}$ and $C_{41}$, (ii) the second antenna transmits the OFDM signals in which are arranged SPs multiplied by the coefficients $C_{12}$, $C_{22}$, $C_{32}$ and $C_{42}$, and (iii) the third antenna transmits the OFDM signals in which are arranged SPs multiplied by the coefficients $C_{13}$, $C_{23}$, $C_{33}$ and $C_{43}$. Here, none of the transmitters (transmit antennas) transmits the OFDM signals in which are arranged SPs multiplied by the coefficients $C_{14}$, $C_{24}$, $C_{34}$ and $C_{44}$. Each receiver that has received the OFDM signals transmitted in the above manner performs demodulation by estimating channels between the three transmit antennas based on the SPs belonging to the four subsets. In this case, out of all the coefficients shown in the matrix of FIG. 12A, the coefficients in the column corresponding to the fourth antenna need not be used.

In the above (3) of Supplementary Notes, the number of subsets is described as a product of numbers $M_s$ (an integer greater than or equal to two) and $M_k$ (an integer greater than or equal to two). Put another way, the number of subsets may be a composite number that is greater than or equal to the number of transmitters.

Figure 27:
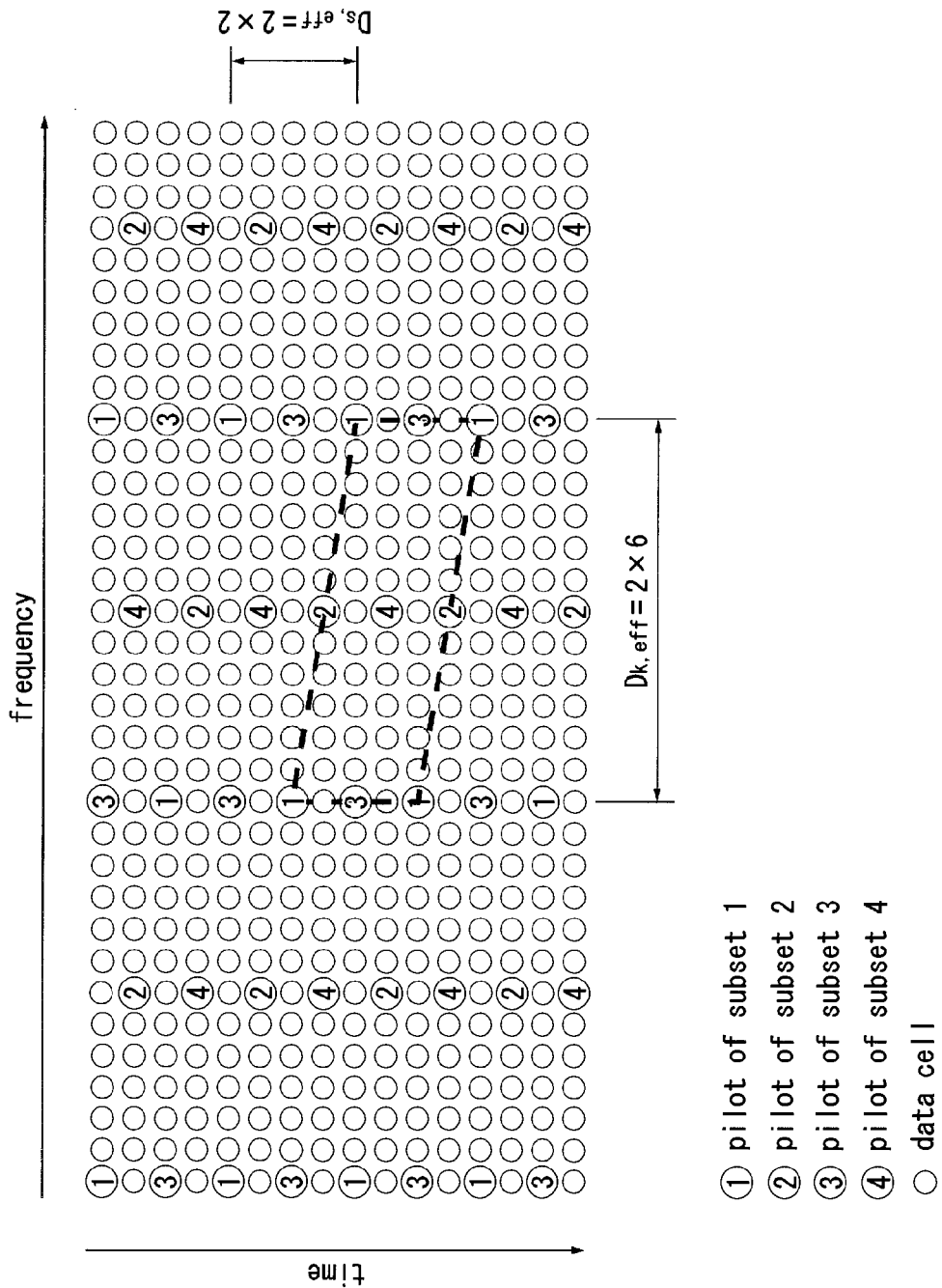
FIG. 27 shows an inventive SP pattern for each subset, which is distinct from the SP pattern shown in FIG. 1.

(5) The SP pattern shown in FIG. 1 pertaining to the above embodiments is merely an example. For example, in DVB-T2, other SP patterns are permitted, one example of which is an SP pattern where SPs are inserted into every sixth subcarrier as shown in FIG. 27. An SP pattern similar to that of FIG. 27 may be employed in transmitters of the present invention. In this case, the SPs should be inserted according to the SP insertion methods described in the above embodiments to realize the pattern of pilots belonging to each subset as shown in FIG. 27. That is to say, provided that the distance between two adjacent SP symbols in an SP-bearing subcarrier is $D_s$ and the distance between two adjacent SP-bearing subcarriers is $D_k$, (i) the distance between SPs belonging to the same subset should be greater than or equal to $2D_s$ in one subcarrier along the symbol direction, (ii) the distance between subcarriers bearing SPs belonging to the same subset should be greater than or equal to $2D_k$, and (iii) between two SPs belonging to a certain subset, another SP belonging to a subset other than said certain subset is arranged, both in time and frequency. In the example of FIG. 27, $D_s=2$ and $D_k=6$.

(6) The above embodiments and variations may be combined partially.

(7) The communication systems pertaining to the present invention with a plurality of transmitters and one or more receivers may each be the MIMO system or the MISO system, as long as each transmitter (transmit antenna) is configured to transmit the signals in which are arranged SPs belonging to subsets corresponding to the respective transmitters (see, for example, FIG. 7).

(8) It is possible to provide a control program that is composed of programming codes such as machine language and high-level language and that causes a processor in each transmitter, or various circuits connected to that processor, to execute the process for inserting pilots into the OFDM transmit signals described in the above embodiments. Such a control program may be recorded on a recording medium, or may be distributed/disseminated via various types of communication chancels. Furthermore, it is also possible to provide a control program that is composed of programming codes such as machine language and high-level language and that causes a processor in each transmitter, or various circuits connected to that processor, to execute the process for estimating channel properties of the OFDM reception signals described in the above embodiments. Such a control program may be recorded on a recording medium, or may be distributed/disseminated via various types of communication chancels. Examples of such a recording medium include an IC card, a hard disk, an optical disc, a flexible disk, ROM, and flash memory. The distributed/disseminated control program is stored in memory or the like that can be read by the processor so as to be provided for use. Each of the functions described in the above embodiments can be realized by the processor executing the control program. The processor may directly execute the control program, or execute the control program after compiling the same, or execute the control program with an interpreter.

(9) Each of the functional constituent elements included in each transmitter and each receiver described in the above embodiments (the Hadamard transform unit, the pilot generation unit, etc.) may be realized as a circuit for executing its functions, or may be realized by one or more processors executing a program, or may be configured as a packaged integrated circuit such as an IC and an LSI. Such a packaged integrated circuit is built in each device to be provided for use. This way, each device can realize the functions described in the above embodiments.

(10) The following describes an exemplary application of the transmission/reception methods explained in the above embodiments, as well as an exemplary configuration of a system using such transmission/reception methods.

Figure 28:
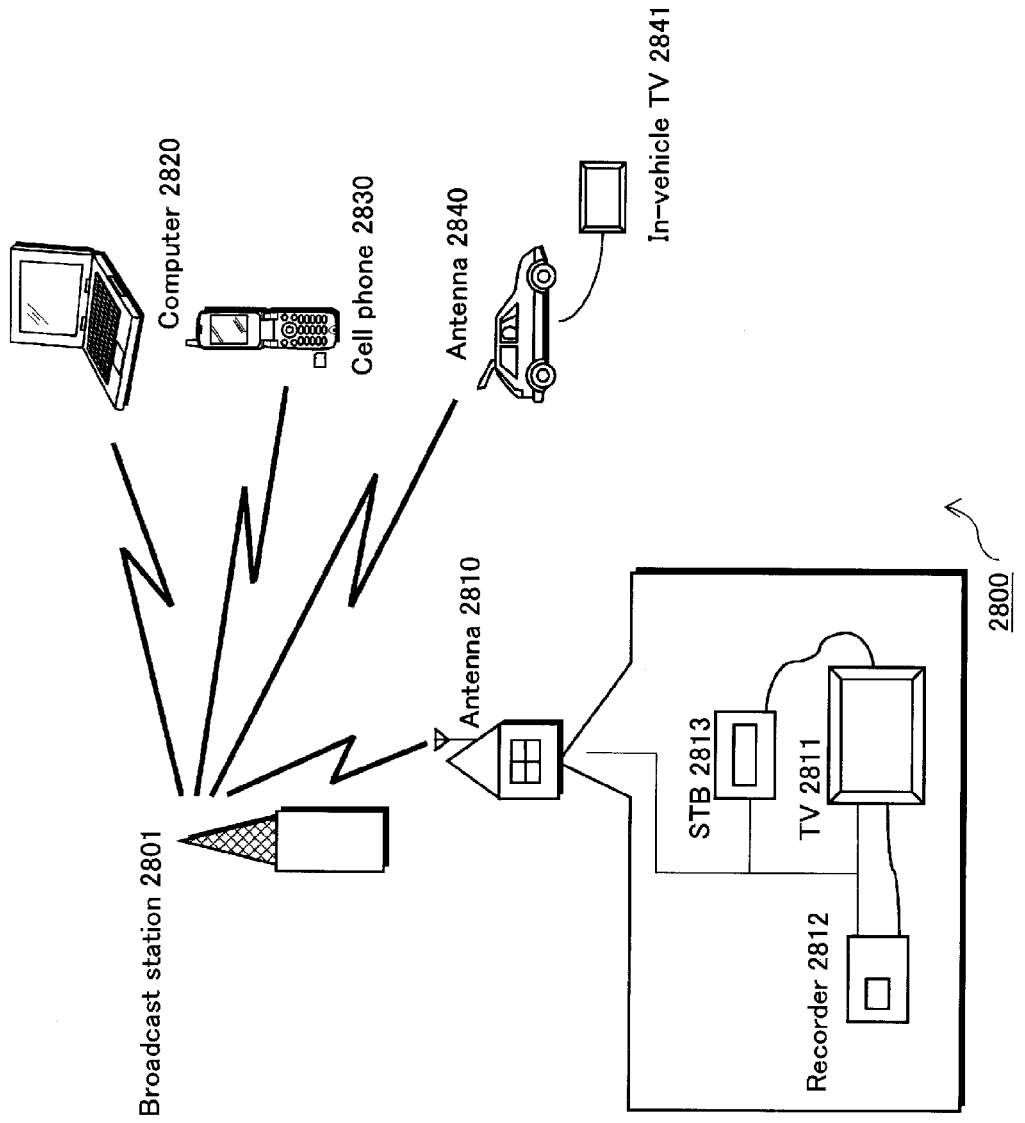
FIG. 28 shows an exemplary configuration of a digital broadcast system pertaining to an embodiment of the present invention.

FIG. 28 shows an exemplary configuration of a system including devices that perform the transmission/reception methods explained in the above embodiments. The transmission/reception methods explained in the above embodiments are implemented in a digital broadcast (or communication) system 2800 shown in FIG. 28 that includes a broadcast station (or a base station) 2801 and various types of receivers, such as a TV (television) 2811, a DVD recorder 2812, an STB (Set Top Box) 2813, a computer 2820, an in-vehicle TV 2841, and a cell phone 2830. More specifically, the broadcast station (base station) 2801 transmits a transmission data stream (e.g., a multiplexed data stream obtained by multiplexing a video data stream, an audio data stream, etc.) to a predetermined transmission band by using the transmission methods explained in the above embodiments.

The signals transmitted from the broadcast station (base station) 2801 are received by antennas (e.g., antennas 2810 and 2840) that are either built in the receivers, or positioned outside the receivers while being connected to the receivers. Each receiver performs the reception operations explained in the above embodiments on the signals received by its antenna, and obtains the received data stream. This way, the digital broadcast system 2800 can achieve the effects of the present invention described in the above embodiments.

The video data stream included in the multiplexed data stream has been encoded with a video encoding method conforming to such standards as MPEG (Moving Picture Experts Group)-2, MPEG-4 AVC (Advanced Video Coding), and VC-1. The audio data stream included in the multiplexed data stream has been encoded with an audio encoding method such as Dolby AC (Audio Coding)-3, Dolby Digital Plus, MLP (Meridian Lossless Packing), DTS (Digital Theater Systems), DTS-HD, and linear PCM (Pulse-Code Modulation).

Figure 29:
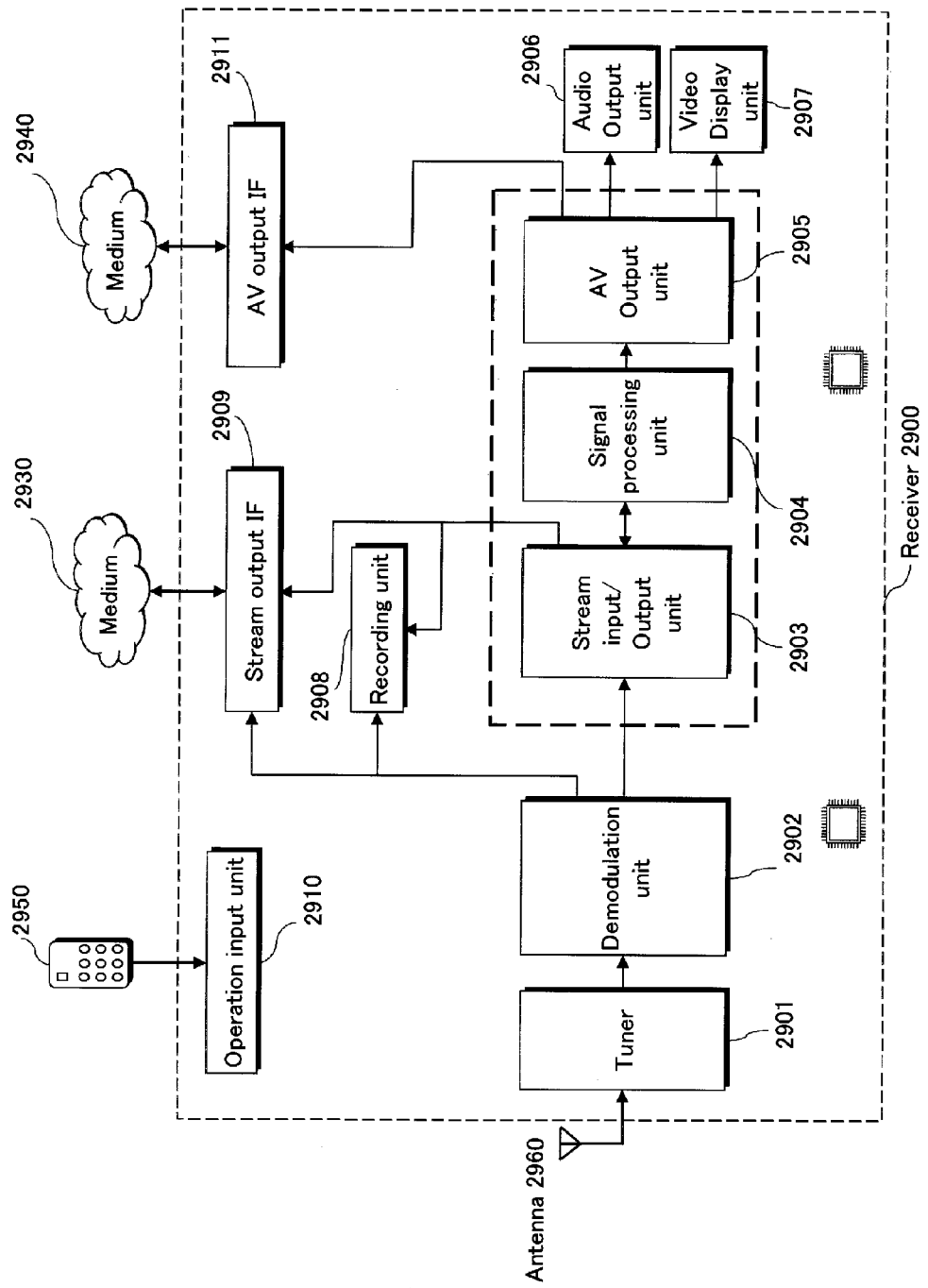
FIG. 29 is a functional structural diagram showing an exemplary structure of a receiver pertaining to an embodiment of the present invention.

FIG. 29 shows the structure of a receiver 2900 used in a digital broadcast system, as one example of devices that perform the reception methods explained in the above embodiments. As shown in FIG. 29, one exemplary structure of the receiver 2900 is such that a modem portion is constituted by one LSI (or one chipset), and a codec portion is constituted by another LSI (or another chipset). The structure of the receiver 2900 shown in FIG. 29 is equivalent to that of such devices as the TV (television) 2811, the DVD recorder 2812, the STB (Set Top Box) 2813, the computer 2820, the in-vehicle TV 2841, and the cell phone 2830 shown in FIG. 28. The receiver 2900 includes a tuner 2901 and a demodulation unit 2902. The tuner 2901 converts radio frequency signals received by an antenna 2960 into baseband signals. The demodulation unit 2902 obtains a multiplexed data stream by performing the reception operations explained in the above embodiments on the baseband signals. As a result, the effects of the present invention described in the above embodiments can be achieved.

The receiver 2900 also includes a stream input/output unit 2903, a signal processing unit 2904, an AV (Audio and Visual) output unit 2905, an audio output unit 2906, and a video display unit 2907. The stream input/output unit 2903 demultiplexes the video data stream and the audio data stream from the multiplexed data stream obtained by the demodulation unit 2902. The signal processing unit 2904 decodes the video data stream into a video signal by using a video decoding method corresponding to the demultiplexed video data stream, and decodes the audio data into an audio signal by using an audio decoding method corresponding to the demultiplexed audio data stream. The AV output unit 2905 outputs the decoded audio signal to the audio output unit 2906, and outputs the decoded video signal to the video display unit 2907. Alternatively, the AV output unit 2905 outputs the decoded audio and video signals to an AV (Audio and Visual) output IF (interface) 2911. The audio output unit 2906 (e.g., a speaker) outputs the decoded audio signal. The video display unit 2907 (e.g., a display) displays the decoded video signal.

By way of example, a user transmits information on a selected channel (a selected (TV) program, selected audio broadcasting, etc.) to an operation input unit 2910 with use of a remote controller 2950. Thereafter, the receiver 2900 obtains the multiplexed data stream corresponding to the selected channel by performing demodulation, error correction decoding, and the like on the received signals that correspond to the selected channel. At this time, the receiver 2900 selects a reception method being appropriate to the selected channel according to information of a transmission method (for example, the SP patterns, the number of subsets, and a modulation method and an error correction method performed on the data stream transmitted by the data cells, which are discussed in the above embodiments) obtained from control symbols included in the received signals. This way, the receiver 2900 can obtain data contained in the data cells transmitted from the broadcast station (base station). In the example described above, the user selects a channel with use of the remote controller 2950. However, the above-described operations are performed also when a channel is selected with use of a channel selection key built in the receiver 2900.

With the above structure, the user can view the program that has been received by the receiver 2900 using the reception methods described in the above embodiments.

Assume a case where the above-described receiver 2900 pertaining to the present invention is built in a TV, a recording device (e.g., a DVD recorder, a Blu-ray recorder, an HDD recorder, and an SD card), and a cell phone. In this case, if the multiplexed data obtained through demodulation and error correction decoding by the demodulation unit 2902 includes (i) data for correcting a default (bug) in software used to cause the TV and the recording device to operate, or (ii) data for correcting a default (bug) in software used to prevent leaks of personal information and recorded data, then a default in software provided in the TV and the recording device may be corrected by installing such data. If the multiplexed data obtained through demodulation and error correction decoding by the demodulation unit 2902 includes data for correcting a default (bug) in software provided in the receiver 2900, then a default in the receiver 2900 may be corrected with such data. This way, the TV, the recording device and the cellular phone in which the receiver 2900 is built can operate in a more stable manner.

The receiver 2900 of the present embodiment also includes a recording unit (drive) 2908 that records the following (i) through (iii) on a recording medium such as a magnetic disk, an optical disc and a nonvolatile semiconductor memory: (i) part of the multiplexed data stream obtained through demodulation and error correction decoding by the demodulation unit 2902 (In some occasions, error correction decoding is not performed on signals obtained through demodulation by the demodulation unit 2902. Also, the receiver 2900 may perform other signal processing after error correction decoding. These are true of the following descriptions that use similar expressions about error correction decoding to those used in this section.); (ii) data corresponding to the data of (i), such as data obtained by compressing the data of (i); and (iii) data obtained by processing video and audio. Here, the optical disc is, for example, a recording medium on/from which information is recorded/read using laser light, such as DVD (Digital Versatile Disc) and BD (Blu-ray Disc). The magnetic disk is, for example, a recording medium that stores information by magnetizing a magnetic material using magnetic flux, such as FD (Floppy Disk) (registered trademark) and a hard disk. The nonvolatile semiconductor memory is, for example, a recording medium made up of semiconductor elements, such as flash memory and ferroelectric random access memory. Examples of the nonvolatile semiconductor memory include an SD card and a flash SSD (Solid State Drive) that incorporate flash memory. It should be noted that the above-listed types of recording media are merely examples. It goes without saying that the recording may be performed with use of a recording medium other than the above-listed recording media.

With the above structure, the user can record and store the program that has been received by the receiver 2900 by using the reception methods described in the above embodiments. Accordingly, the receiver 2900 can read the recorded data and the user can view the program corresponding to the recorded data at any time after the broadcast time of the program.

It has been described above that in the receiver 2900, the recording unit 2908 records the multiplexed data stream obtained through demodulation and error correction decoding by the demodulation unit 2902. Alternatively, part of the multiplexed data stream may be extracted and recorded. For instance, when the multiplexed data stream obtained by the demodulation unit 2902 includes contents etc. that are provided from data broadcast services and that are different from the video data stream and the audio data stream, the recording unit 2908 may record a new multiplexed data stream that is obtained by extracting and multiplexing the video data stream and the audio data stream in the multiplexed data stream obtained by the demodulation unit 2902. Alternatively, the recording unit 2908 may record a new multiplexed data stream that is obtained by multiplexing one of the video data stream and the audio data stream included in the multiplexed data stream obtained by the demodulation unit 2902. In addition, the recording unit 2908 may record the aforementioned contents that are included in the multiplexed data and that are provided from the data broadcast services.

As one example, the stream input/output unit 2903 performs the processing for extracting and multiplexing part of plural data pieces included in the multiplexed data obtained through demodulation and error correction decoding by the demodulation unit 2902. More specifically, with an instruction from a controller such as CPU (not illustrated), the stream input/output unit 2903 generates a new multiplexed data stream by (i) demultiplexing the multiplexed data stream obtained by the demodulation unit 2902 into demultiplexed data streams, such as a video data stream, an audio data stream, and other contents provided from data broadcast services, and (ii) extracting and multiplexing only a specified data stream out of the demultiplexed data streams. Which data stream should be extracted from the demultiplexed data streams may be determined by the user, or may be predetermined for each type of recording media.

With the above structure, the receiver 2900 can extract and record only the data required to view the recorded program. This can reduce the data size of the data to be recorded.

It has been described above that the recording unit 2908 records the multiplexed data obtained through demodulation and error correction decoding by the demodulation unit 2902. Alternatively, the recording unit 2908 may perform the recording in the following steps: (i) converting the original video data stream included in the multiplexed data stream obtained by the demodulation unit 2902 into a new video data stream, which has been encoded with a video encoding method that is different from a video encoding method performed on the original video data stream, so that the data size or bit rate of the new video data stream is smaller/lower than the data size or bit rate of the original video data stream; and (ii) recording a new multiplexed data stream obtained by multiplexing the post-conversion new video data stream. The video encoding methods that are respectively performed on the original video data stream and the post-conversion new video data stream may conform to different standards, or may conform to the same standard but use different parameters for encoding. In the similar manner, the recording unit 2908 may perform the recording in the following steps: (i) converting the original audio data stream included in the multiplexed data stream obtained by the demodulation unit 2902 into a new audio data stream, which has been encoded with an audio encoding method that is different from an audio encoding method performed on the original audio data stream, so that the data size or bit rate of the new audio data stream is smaller/lower than the data size or bit rate of the original audio data stream; and (ii) recording a new multiplexed data stream obtained by multiplexing the post-conversion new audio data.

As one example, the stream input/output unit 2903 and the signal processing unit 2904 perform the processing for converting the original video data stream and audio data stream included in the multiplexed data stream obtained by the demodulation unit 2902 into a new video data stream and a new audio data stream that have different data sizes or bit rates from the original video data stream and audio data stream. More specifically, with an instruction from the controller such as CPU, the stream input/output unit 2903 demultiplexes the multiplexed data stream obtained by the demodulation unit 2902 into demultiplexed data streams, such as a video data stream, an audio data stream, and other contents provided from data broadcast services. With an instruction from the controller, the signal processing unit 2904 performs (i) processing for converting the demultiplexed original video data stream into a new video data stream that has been encoded with a video encoding method that is different from a video encoding method performed on the original video data stream, and (ii) processing for converting the separated original audio data stream into a new audio data stream that has been encoded with an audio encoding method that is different from an audio encoding method performed on the original audio data stream. With an instruction from the controller, the stream input/output unit 2903 generates a new multiplexed data stream by multiplexing the post-conversion new video data stream and the post-conversion new audio data stream. With the instruction from the controller, the signal processing unit 2904 may perform the conversion processing on one or both of the original video data stream and the original audio data stream. Furthermore, the data sizes or bit rates of the post-conversion new video data stream and the post-conversion new audio data stream may be determined by the user, or may be predetermined for each type of recording media.

With the above structure, the receiver 2900 can perform the recording after changing the data sizes or bit rates of the video data stream and the audio data stream in accordance with the data size of data that can be recorded on the recording medium, or in accordance with the speed at which the recording unit 2908 records/reads data. This way, the recording unit can record a program even when the data size of data that can be recorded on the recording medium is smaller than the data size of the multiplexed data stream obtained by the demodulation unit 2902, or when the speed at which the recording unit records/reads data is slower than the bit rate of the multiplexed data stream obtained by the demodulation unit 2902. Consequently, the receiver 2900 can read the recorded data and the user can view the program corresponding to the recorded data at any time after the broadcast time of the program.

The receiver 2900 further includes a stream output IF (interface) that transmits the multiplexed data stream obtained by the demodulation unit 2902 to an external device via a communication medium 2930. One example of the stream output IF 2909 is a wireless communication device that transmits the demodulated multiplexed data to the external device via a wireless medium (equivalent to the communication medium 2930), by using a wireless communication method conforming to the wireless communication standards such as Wi-Fi (registered trademark) (e.g., IEEE 802.11a, IEEE 802.11b, IEEE 802.11g, and IEEE 802.11n), WiGig, WirelessHD, Bluetooth, and ZigBee. Alternatively, the stream output IF 2909 may be a wired communication device that transmits the demodulated multiplexed data stream to the external device via a wired communication channel (equivalent to the communication medium 2930) connected to the stream output IF 2909, by using a communication method conforming to the wired communication standards such as Ethernet, USB (Universal Serial Bus), PLC (Power Line Communication), and HDMI (High-Definition Multimedia Interface).

With the above structure, the user can use, on the external device, the multiplexed data stream that has been received by the receiver 2900 using the reception methods described in the above embodiments. Note that the use of the multiplexed data by the user includes (i) real-time viewing of the multiplexed data stream by using the external device, (ii) recording of the multiplexed data stream with a recording unit provided in the external device, and (iii) transmission of the multiplexed data stream from the external device to yet another external device.

It has been described above that in the receiver 2900, the output IF 2909 outputs the multiplexed data stream obtained by the demodulation unit 2902. Alternatively, part of the multiplexed data may be extracted and output. For instance, when the multiplexed data stream obtained by the demodulation unit 2902 includes contents etc. that are provided from data broadcast services and that are different from the video data stream and the audio data stream, the stream output IF 2909 may output a new multiplexed data stream that is obtained by extracting and multiplexing the video data stream and audio data stream in the multiplexed data stream obtained by the demodulation unit 2902. Alternatively, the stream output IF 2909 may output a new multiplexed data stream that is obtained by multiplexing one of the video data stream and audio data stream included in the multiplexed data stream obtained by the demodulation unit 2902.

As one example, the stream input/output unit 2903 performs the processing for extracting and multiplexing part of the multiplexed data stream obtained by the demodulation unit 2902. More specifically, with an instruction from the controller such as CPU (Central Processing Unit, not illustrated), the stream input/output unit 2903 generates a new multiplexed data stream by (i) demultiplexing the multiplexed data stream obtained by the demodulation unit 2902 into demultiplexed data streams, such as a video data stream, an audio data stream, and other contents provided from data broadcast services, and (ii) extracting and multiplexing only a specified data stream out of the demultiplexed data streams. Which data stream should be extracted from the demultiplexed data streams may be determined by the user, or may be predetermined for each type of the stream output IF 2909.

With the above structure, the receiver 2900 can extract and output only the data required by the external device. This can reduce the communication band consumed by outputting the multiplexed data.

It has been described above that the stream output IF 2909 outputs the multiplexed data stream obtained by the demodulation unit 2902. Alternatively, the stream output IF 2909 may perform the output in the following steps: (i) converting the original video data stream included in the multiplexed data stream obtained by the demodulation unit 2902 into a new video data stream, which has been encoded with a video encoding method that is different from a video encoding method performed on the original video data stream, so that the data size or bit rate of the new video data stream is smaller/lower than the data size or bit rate of the original video data stream; and (ii) outputting a new multiplexed data stream obtained by multiplexing the post-conversion new video data stream. The video encoding methods that are respectively performed on the original video data stream and the post-conversion new video data stream may conform to different standards, or may conform to the same standard but use different parameters for encoding. In the similar manner, the stream output IF 2909 may perform the output in the following steps: (i) converting the original audio data stream included in the multiplexed data stream obtained by the demodulation unit 2902 into a new audio data stream, which has been encoded with an audio encoding method that is different from an audio encoding method performed on the original audio data stream, so that the data size or bit rate of the new audio data stream is smaller/lower than the data size or bit rate of the original audio data stream; and (ii) outputting a new multiplexed data stream obtained by multiplexing the post-conversion new audio data stream.

As one example, the stream input/output unit 2903 and the signal processing unit 2904 perform the processing for converting the original video data stream and audio data stream included in the multiplexed data stream obtained by the demodulation unit 2902 into new video data and audio data that have different data sizes or bit rates from the original video data stream and audio data stream. More specifically, with an instruction from the controller, the stream input/output unit 2903 demultiplexes the multiplexed data stream obtained by the demodulation unit 2902 into demultiplexed data streams, such as a video data stream, an audio data stream, and other contents provided from data broadcast services. With an instruction from the controller, the signal processing unit 2904 performs (i) processing for converting the demultiplexed original video data stream into a new video data stream that has been encoded with a video encoding method that is different from a video encoding method performed on the original video data stream, and (ii) processing for converting the demultiplexed original audio data stream into a new audio data stream that has been encoded with an audio encoding method that is different from an audio encoding method performed on the original audio data stream. With an instruction from the controller, the stream input/output unit 2903 generates a new multiplexed data stream by multiplexing the post-conversion new video data stream and the post-conversion new audio data stream. With the instruction from the controller, the signal processing unit 2904 may perform the conversion processing on one or both of the original video data stream and the original audio data stream. Furthermore, the data sizes or bit rates of the post-conversion new video data stream and the post-conversion new audio data stream may be determined by the user, or may be predetermined for each type of the stream output IF 2909.

With the above structure, the receiver 2900 can perform the output after changing the bit rates of video data and audio data in accordance with the speed at which communication is performed with the external device. This way, the stream output IF can output a new multiplexed data stream to the external device even when the speed at which the communication is performed with the external device is slower than the bit rate of the multiplexed data stream obtained by the demodulation unit 2902. Consequently, the user can use the new multiplexed data stream on another communication device.

The receiver 2900 further includes the AV output IF 2911 that outputs, to the external device and an external communication medium, a video signal and an audio signal decoded by the signal processing unit 2904. One example of the AV output IF 2911 is a wireless communication device that transmits the modulated video signal and audio signal to the external device via a wireless medium, by using a wireless communication method conforming to the wireless communication standards such as Wi-Fi (registered trademark) (e.g., IEEE 802.11a, IEEE 802.11b, IEEE 802.11g, and IEEE 802.11n), WiGig WirelessHD, Bluetooth, and ZigBee. Alternatively, the AV output IF 2911 may be a wired communication device that transmits the modulated video signal and audio signal to the external device via a wired communication channel connected to the AV output IF 2911, by using a communication method conforming to the wired communication standards such as Ethernet, USB, PLC and HDMI. Alternatively, the AV output IF 2911 may be a terminal for connecting to a cable that outputs the video signal and audio signal as-is, i.e., as analog signals.

With the above structure, the user can use the video signal and audio signal decoded by the signal processing unit 2904 on the external device.

The receiver 2900 further includes an operation input unit 2910 that receives input of a user operation. The receiver 2900 switches between various operations based on a control signal that is input to the operation input unit 2910 in accordance with the user operation. For example, the receiver 2900 switches between (i) ON and OFF of the power, (ii) channels to be received, (iii) display and non-display of subtitles, (iv) languages to be displayed, (v) volumes of audio to be output from the audio output unit 2906. The receiver 2900 also changes various settings, such as channels that can be received.

The receiver 2900 may have the function of displaying an antenna level indicating the reception quality of signals that are being received by itself. The antenna level is an index showing the reception quality calculated based on, for example, RSSI (Received Signal Strength Indication/Indicator, which indicates the strength of the received signals), a reception electric field strength, C/N (carrier-to-noise power ratio), BER (Bit Error Rate), a packet error rate, a frame error rate, and channel state information of the signals received by the receiver 2900. The antenna level is a signal indicating the signal level and the quality (superior, inferior, etc.) of the received signals. In this case, the demodulation unit 2902 has functions of a reception quality measurement unit that measures RSSI, the reception electric field strength, C/N, BER, the packet error rate, the frame error rate, the channel state information, etc. of the received signals. The receiver 2900 displays the antenna level (the signal indicating the signal level and the quality (superior, inferior, etc.) of the received signals) on the video display unit 2907 in format that can be distinguished by the user. The display format of the antenna level (the signal indicating the signal level and the quality (superior, inferior, etc.) of the received signals) may display numerical values corresponding to RSSI, the reception electric field strength, C/N, BER, the packet error rate, the frame error rate, the channel state information, etc., or may display different images in accordance with RSSI, the reception electric field strength, C/N, BER, the packet error rate, the frame error rate, the channel state information, etc.

The following explains an exemplary method of calculating an antenna level from the signals received by the receiver 2900 that uses the transmission methods described in the above embodiments. By using the methods described in the above embodiments, a 2D interpolation unit 1550 (not illustrated in FIG. 29) of the receiver 2900 interpolates signals of pilots that have been detected according to the SP pattern for each subset. The reception quality measurement unit of the receiver 2900 calculates an interpolation error, which is an error between the interpolated values and the signals of the CPs that have been actually received, by using (i) the signals of the received CPs at CP-bearing cells, and (ii) the interpolated values of subsets to which these CPs belong. It is considered that the smaller the calculated interpolation error, the higher the reception quality. Thus, the receiver 2900 generates an index indicating the reception quality based on the calculated interpolation error, and displays the index as an antenna level. At this time, as the index indicating the reception quality, the receiver 2900 may use an average value or the largest value of interpolation errors calculated from the CPs within a predetermined unit of time. In addition, the interpolation error may be expressed using an absolute value or a value normalized by the reception power.

When the Hadamard transform is used to encode pilot signals, the reception quality measurement unit of the receiver 2900 may be configured as follows. By using (i) values of signals separated with use of channel components $h_1, \ldots, h_n$, which are calculated by performing the Hadamard transform (where n is an integer greater than or equal to two and is the same as the number of transmit antennas), and (ii) values of known CPs transmitted from antennas of each transmitter, the reception quality measurement unit of the receiver 2900 calculates an error included in the separated signals. The receiver 2900 generates an index indicating the reception quality based on the calculated error included in the separated signals, and displays the index as an antenna level. At this time, as the index indicating the reception quality, the receiver 2900 may use an average value or the largest value of errors calculated within a predetermined unit of time as included in the separated signals.

With the above structure, in a case where signals are received by using the reception methods described in the above embodiments, the user can grasp the antenna level (the signal indicating the signal level and the quality (superior, inferior, etc.) of the received signals) either numerically or visually.

Furthermore, regarding methods of displaying the antenna level, the receiver 2900 may be configured as follows. Although it is not necessary to combine the following several methods of displaying the antenna level with the SP pattern described in the above embodiments, it goes without saying that such a combination is expected to improve the reception quality.

For example, the receiver 2900 may have functions of (i) calculating indices indicating reception qualities of the separated signals, respectively, and (ii) displaying the indices as multiple antenna levels (signals indicating the signal levels and the qualities (superior, inferior, etc.) of the respective separated signals), either all at once or by switching from display of one index to display of another index. Alternatively, the receiver 2900 may have functions of (i) calculating an index indicating the reception quality of a group including all or some of the separated signals, and (ii) displaying the index as the antenna level (the signal indicating the signal level and the quality (superior, inferior, etc.) of the respective separated signals).

Furthermore, the receiver 2900 may be configured as follows in a case where the broadcast station (base station) 2801 incorporates multiple transmission modes such as MISO and SISO (Signal Input Single Output) other than MIMO explained in the above embodiments and performs the transmission while switching from one transmission mode to another over time. For example, the receiver 2900 may have functions of (i) calculating indices indicating reception qualities of the multiple transmission modes, respectively, and (ii) displaying the indices as multiple antenna levels (signals indicating the signal levels and the qualities (superior, inferior, etc.) of the respective received signals), either all at once or by switching from display of one index to display of another index. Alternatively, the receiver 2900 may have functions of (i) calculating an index indicating the reception quality of a group including all or some of the multiple transmission modes, and (ii) displaying the index as the antenna level (the signal indicating the signal level and the quality (superior, inferior, etc.) of the respective received signals).

Furthermore, the receiver 2900 may be configured as follows in a case where the broadcast station (base station) 2801 groups a plurality of data streams that constitute a program (e.g., a video data stream and an audio data stream) into a plurality of hierarchical layers and performs the transmission by using a hierarchical transmission method in which a transmission mode, a modulation method, error correction encoding, an encoding rate, etc. are independently configurable for each hierarchical layer. For example, the receiver 2900 may have functions of (i) calculating indices indicating the reception qualities of hierarchical layers, respectively, and (ii) displaying the indices as multiple antenna levels (signals indicating the signal levels and the qualities (superior, inferior, etc.) of the received signals), either all at once or by switching from display of one index to display of another index. Alternatively, the receiver 2900 may have functions of (i) calculating an index indicating the reception quality of a group including all or some of the multiple hierarchical layers, and (ii) displaying the index as the antenna level (the signal indicating the signal level and the quality (superior, inferior, etc.) of the received signals).

With the above structure, in a case where signals are received by using the reception methods described in the above embodiments, the user can grasp the antenna level (the signal indicating the signal level and the quality (superior, inferior, etc.) of the received signal), either numerically or visually, in units of reception that can be distinguishable (e.g., the separated signals, multiple transmission mode, and multiple hierarchical layers).

In an exemplary case described above, the receiver 2900 includes the audio output unit 2906, the video display unit 2907, the recording unit 2908, the stream output IF 2909, and the AV output IF 2911. However, the receiver 2900 need not include all of these structural elements. As long as the receiver 2900 includes at least one of these structural elements, the user can use the multiplexed data stream obtained through demodulation by the demodulation unit 2902 and error correction decoding. Therefore, each receiver may include any combination of the above structural elements depending on how it is used.

The present invention is useful in a communication system where multiple transmit antennas transmit signals at the same time in the same frequency band and the transmitted signals are received and demodulated.

The invention claimed is:

1. A signal generation device that generates a signal to be transmitted by a multi-antenna OFDM transmitter having N antennas, N being an integer greater than or equal to two, the signal generation device comprising:

a multi-antenna encoder which, in operation, generates a plurality of data streams, one for each of the N transmit antennas, each data stream consisting of a succession of OFDM symbols, each OFDM symbol consisting of a plurality of OFDM cells, each OFDM cell being associated with one of a plurality of subcarriers;

pilot generation circuitry which, in operation, generates, for each of the plurality of data streams, a plurality of scattered pilots, said plurality of scattered pilots being partitioned into M subsets, each of the scattered pilots being encoded on the basis of the subset to which the scattered pilot belongs and the data stream into which the scattered pilot is to be inserted, and pilot inserting circuitry which, in operation, insets, for each of the plurality of data streams, the plurality of scattered pilots into the data stream in accordance with a predefined periodic pattern in which a temporal spacing between two OFDM symbols having scattered pilots in OFDM cells associated with the same subcarrier is equal to $D_s$ and a frequency spacing of two subcarriers bearing scattered pilots in any of the OFDM symbols is equal to $D_k$, each of $D_s$ and $D_k$ being an integer greater than or equal to two, wherein M is greater than or equal to N and satisfies a relationship $M=M_s M_k$, each of $M_s$ and $M_k$ being an integer greater than or equal to two, and the insertion of the plurality of scattered pilots into the data stream is performed in such a manner that a temporal spacing between two OFDM symbols having scattered pilots of the same subset in OFDM cells associated with the same subcarrier is equal to $D_s M_s$ and a frequency spacing of two subcarriers bearing scattered pilots of the same subset in any of the OFDM symbols is equal to $D_k M_k$.

2. A demodulation device comprising:

a receiver to which, in operation, a received signal consisting of a succession of OFDM symbols is input, each OFDM symbol consisting of a plurality of OFDM cells, each OFDM cell being associated with one of a plurality of subcarriers;

pilot extraction circuitry which, in operation, (i) extracts scattered pilots from the received signal in accordance with a predefined periodic pattern in which a temporal spacing between two OFDM symbols having scattered pilots in OFDM cells associated with the same subcarrier is equal to $D_s$ and a frequency spacing of two subcarriers bearing scattered pilots in any of the OFDM symbols is equal to $D_k$, each of $D_s$ and $D_k$ being an integer greater than or equal to two, and (ii) partitions the extracted scattered pilots into M subsets; and channel estimation circuitry which, in operation, estimates a plurality of channel components from the M subsets of scattered pilots, each channel component representing a channel condition between one of a plurality of transmitters and the demodulation device, wherein M satisfies a relationship $M=M_s M_k$, each of $M_s$ and $M_k$ being an integer greater than or equal to two, and a temporal spacing between two OFDM symbols having scattered pilots of the same subset in OFDM cells associated with the same subcarrier is equal to $M_s D_s$ and a frequency spacing of two subcarriers bearing scattered pilots of the same subset in any of the OFDM symbols is equal to $M_k D_k$.

* * * * *